United States Patent
Karita et al.

[11] Patent Number: 5,850,238
[45] Date of Patent: Dec. 15, 1998

[54] RECORDING HEAD WITH COVER

[75] Inventors: Seiichiro Karita, Yokohama; Hideo Saikawa, Kawasaki; Hiroshi Sugitani, Machida; Yoshifumi Hattori, Yamato; Masami Ikeda, Tokyo; Asao Saito, Yokohama; Kazuaki Masuda, Sagamihara; Akio Saito, Hadano; Tsuyoshi Orikasa, Kasukabe; Toshiaki Nagashima; Norio Hikake, both of Yokohama, all of Japan

[73] Assignee: Canon Kabushiki Kaisha, Tokyo, Japan

[21] Appl. No.: 105,964

[22] Filed: Aug. 13, 1993

Related U.S. Application Data

[62] Division of Ser. No. 583,334, Sep. 17, 1990, Pat. No. 5,262,802.

[30] Foreign Application Priority Data

| Sep. 18, 1989 | [JP] | Japan | 1-241053 |
| Sep. 19, 1989 | [JP] | Japan | 1-241052 |
| Dec. 6, 1989 | [JP] | Japan | 1-318078 |
| Dec. 6, 1989 | [JP] | Japan | 1-318079 |
| Feb. 13, 1990 | [JP] | Japan | 2-031899 |

[51] Int. Cl.$^6$ .................................................. B41J 2/165
[52] U.S. Cl. ................................................ 347/29; 347/31
[58] Field of Search .............................. 347/29, 31, 65, 347/50, 108, 49

[56] References Cited

U.S. PATENT DOCUMENTS

| 3,016,177 | 1/1962 | Chaplin | 229/2.5 |
| 3,610,765 | 10/1971 | Bok | 401/134 |
| 4,045,802 | 8/1977 | Fukazawa et al. | 347/29 |
| 4,126,868 | 11/1978 | Kirner | 346/140 R |
| 4,313,124 | 1/1982 | Hara | 346/140 R |
| 4,334,234 | 6/1982 | Shirato et al. | 347/65 |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,600,927 | 7/1986 | Sugitani | 346/1.1 |
| 4,635,080 | 1/1987 | Watanabe | 347/49 |
| 4,638,336 | 1/1987 | Hofmann | 346/140 R |
| 4,677,447 | 6/1987 | Nielsen | 346/140 R |
| 4,689,642 | 8/1987 | Sugitani | 346/140 R |

(List continued on next page.)

FOREIGN PATENT DOCUMENTS

| 0378241 | 7/1990 | European Pat. Off. . | |
| 0418828 | 3/1991 | European Pat. Off. . | |
| 2288688 | 5/1976 | France . | |
| 2912926 | 10/1980 | Germany . | |
| 3511346 | 10/1985 | Germany . | |
| 3522799 | 1/1987 | Germany . | |
| 54-56847 | 5/1979 | Japan . | |
| 58-7362 | 1/1983 | Japan | 347/29 |
| 59-123670 | 7/1984 | Japan . | |
| 59-138461 | 8/1984 | Japan . | |
| 59-145157 | 8/1984 | Japan . | |
| 60-71260 | 4/1985 | Japan . | |
| 2107284 | 4/1983 | United Kingdom . | |

Primary Examiner—Valerie Lund
Attorney, Agent, or Firm—Fitzpatrick, Cella, Harper & Scinto

[57] ABSTRACT

A sealed ink jet assembly which is removable from an ink jet apparatus includes an ink jet head which has an ejection outlet found at a first surface of the ink jet head, an energy generating element for generating energy to eject ink through the ejection outlet, and an electric contact portion for supplying an electric signal from the ink jet apparatus to the energy generating element by mounting the electric contact portion to the ink jet apparatus. The electric contact portion is provided on the surface of the ink jet head which differs from the first surface, and an integral sealing member covers both the ink ejection outlet and the electric contact portion. The integral sealing member is removed when the assembly is mounted onto the ink jet apparatus.

2 Claims, 14 Drawing Sheets

U.S. PATENT DOCUMENTS

| | | | |
|---|---|---|---|
| 4,707,714 | 11/1987 | Rosenthal et al. | 346/140 R |
| 4,723,129 | 2/1988 | Endo et al. | 346/1.1 |
| 4,740,796 | 4/1988 | Endo et al. | 346/1.1 |
| 4,769,658 | 9/1988 | Oda et al. | 346/140 R |
| 4,855,764 | 8/1989 | Humbs et al. | 346/140 R |
| 5,051,759 | 9/1991 | Karita et al. | 346/140 R |
| 5,148,192 | 9/1992 | Izumida et al. | 346/140 R |
| 5,148,203 | 9/1992 | Hirano | 346/140 R |
| 5,155,502 | 10/1992 | Kimura et al. | 346/140 R |
| 5,162,818 | 11/1992 | Karita et al. | 346/140 R |
| 5,182,581 | 1/1993 | Kashimura et al. | 346/140 R |
| 5,187,497 | 2/1993 | Hirano et al. | 346/140 R |
| 5,189,443 | 2/1993 | Arashima et al. | 346/140 R |
| 5,216,448 | 6/1993 | Unosawa et al. | 346/140 R |
| 5,231,425 | 7/1993 | Masuda et al. | 346/140 R |
| 5,237,342 | 8/1993 | Saikawa et al. | 346/140 R |

RECORDING HEAD WITH COVER

This application is a division of application Ser. No. 07/583,334, filed on Sep. 17, 1990, now U.S. Pat. No. 5,262,802.

FIELD OF THE INVENTION AND RELATED ART

The present invention relates to a recording head and a recording head with ink container usable with a printer, a copying machine, an ink jet recording apparatus or the like, and to storage method thereof, and also to a gap usable for the storage.

The present invention also relates to a package for an ink jet cartridge.

It is known that an ink jet recording head is used in the apparatus having a cap for closing ejection outlets for the recovery operation for improving the ejection property. It is also known that a large covering member for covering the ejection outlets an air vent after terminating the recording operation.

An ink jet recording head with an integral ink container is put on sale. On the sale, the recording head has a sealing tape stack on the ejection outlet side surface thereof, and in some case, it is contained in a package.

However, when the recording head is bought and the initial recording is to be started, the air or gas in the recording head is different depending on the length in which the recording head is storaged. In some cases, it is difficult to reach the stabilized operation even if the recovery means is used. To cope with this problem, an attempt has been made to use a stickier tape. However, then, stronger force is required to peel the tape with the possible result falling the recording head or with the result of the ink scattering from the recording head. On the other hand, even if the sealing tape is peeled off in good order, the adhesive material remains in the ejection outlets or around the outlets, thus impeding the good recording.

If the ejection side surface of the recording head is in a stepped form, even the sealing tape is not used conventionally. This is because of the above-described problems and also because of the difficulty in attaching the tape.

SUMMARY OF THE INVENTION

Accordingly, it is a principal object of the present invention to provide a recording head and a method of storage thereof, which do not bring about the complicated recovering means structure, but permit good initial recording after long non-use period.

The present invention deals with the problem which have not been predicted. Regarding recording heads, there have been made various proposals directed to the problems during the recording operation. However, there is no indication of the above-described problems. The inventors have carried out various experiments and made various investigations regarding the situation in which the recording heads are placed on the market, and have found the following problems.

In some case, the ink is scattered, and the ink appears in the package although the causes are not known. When the ejection outlets are closed, the ink does not leak during usual long term tests or vibration tests. Unexpectedly, however, when the recording head is slowly and continuously rotated or swung, the ink has been found to leak through the air vent. The tendency of the leakage is stronger in the initial state before it is put on sale in the store. However, once the recording operation using it is started the leakage does not occur.

It is another object of the present invention to provide a storage method and a cap for a recording head having a stepped surfaces.

It is a further object of the present invention to provide a recording head, a storage method therefor and a cap therefor, in which the initial recording operation is stabilized after various storage period.

According to an aspect of the present invention, there is provided a recording head, comprising: an ejection outlet; a covering member for covering said ink ejection outlet.

According to another aspect of the present invention, there is provided a recording head, comprising: an ink container provided with an air vent opening; an ink ejection outlet; a sealing member for sealing said ejection outlets and the air vent; an urging member for urging said sealing member to said ejection outlet.

According to a further aspect of the present invention, there is provided a recording head cap, comprising: an engaging portion engageable with a recording head; a flexible sheet for sealing an ejection outlet and an air vent opening of the recording head; and an elastic member on said flexible sheet to be contacted to the ejection outlet.

According to a further aspect of the present invention, there is provided an ink jet cartridge container, comprising: a main body having a recess for accommodating an ink jet cartridge; a cover for covering an opening of the recess; said main body includes a wall out of contact with the ink jet cartridge and an inward projection from the wall to support the ink jet cartridge.

According to a further aspect of the present invention, there is provided a method of starting use of an ink jet cartridge having a recording head with an ink ejection outlet and a ink container integral therewith and having an air vent opening, the ejection outlet and the air vent opening being sealed, wherein the air vent opening is first unsealed, and then the ejection outlet is unsealed.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

FIGS. 2, 3, 4, 5 and 6 illustrate an ink jet unit IJU, an ink jet heat IJH, an ink container IT, an ink jet cartridge IJC, a head carriage HC and a main assembly IJRA of an ink jet recording apparatus, according to an embodiment of the present invention, and relations among them. The structures of the respective elements will be described in the following.

Figure 2:
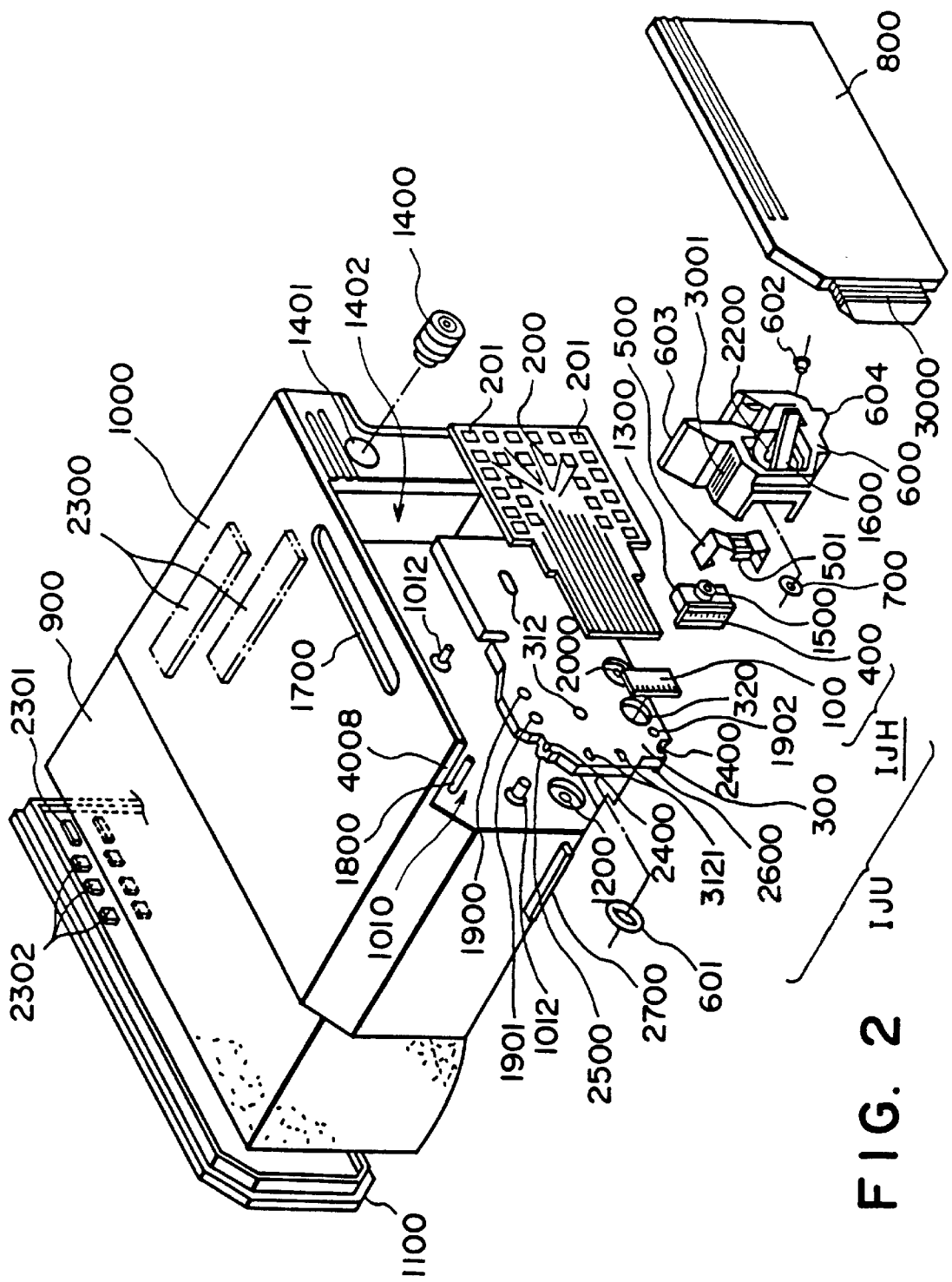
FIG. 2 is an exploded perspective view of an ink jet cartridge.
Figure 3:
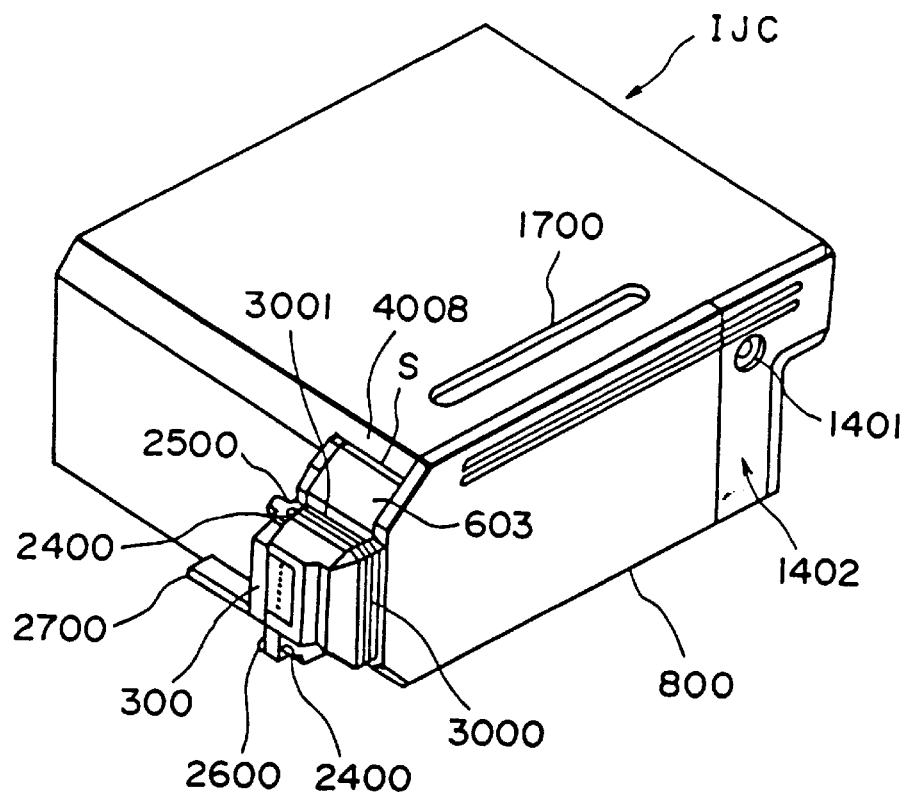
FIG. 3 is a perspective view of the ink jet cartridge.

As will be understood from the perspective view of FIG. 3, the ink jet cartridge IJC in this embodiment has a relatively large ink accommodation space, and an end portion of the ink jet unit IJU is slightly projected from the front side surface of the ink container IT. The ink jet cartridge IJC is mountable at correct position on the carriage HC (FIG. 5) of the ink jet recording apparatus main assembly IJRA by proper positioning means and with electric contacts, which will be described in detail hereinafter. It is, in this embodiment, a disposable type head detachably mountable on the carriage AC. The structures disclosed in FIGS. 2–6 contain various novel features, which will first be described generally.

(i) Ink Jet Unit IJU

The ink jet unit IJU is of a bubble jet recording type using electrothermal transducers which generate thermal energy, in response to electric signals, to produce film boiling of the ink.

Referring to FIG. 2, the unit comprises a heater board 100 having electrothermal transducers (ejection heaters) arranged in a line on an Si substrate and electric lead lines made of aluminum or the like to supply electric power thereto. The electrothermal transducer and the electric leads are formed by a film forming process. A wiring board 200 is associated with the heater board 100 and includes wiring corresponding to the wiring of the heater board 100 (connected by the wire bonding technique, for example) and pads 201 disposed at an end of the wiring to receive electric signals from the main assembly of the recording apparatus.

A top plate 1300 is provided with grooves which define partition walls for separating adjacent ink passages and a common liquid chamber for accommodating the ink to be supplied to the respective ink passages. The top plate 1300 is formed integrally with an ink jet opening 1500 for receiving the ink supplied from the ink container IT and directing the ink to the common chamber, and also with an orifice plate 400 having the plurality of ejection outlets corresponding to the ink passages. The material of the integral mold is preferably polysulfone, but may be another molding resin material.

A supporting member 300 is made of metal, for example, and functions to support a backside of the wiring board 200 in a plane, and constitutes a bottom plate of the ink jet unit IJU. A confining spring 500 is in the form of "M" having a central portion urging to the common chamber with a light pressure, and a clamp 501 urges concentratedly with a line pressure to a part of the liquid passage, preferably the part in the neighborhood of the ejection outlets. The confining spring 500 has legs for clamping the heater board 100 and the top plate 1300 by penetrating through the openings 3121 of the supporting plate 300 and engaging the back surface of the supporting plate 300. Thus, the heater board 100 and the top plate 1300 are clamped by the concentrated urging force by the legs and the clamp 501 of the spring 500. The supporting plate 300 has positioning openings 312, 1900 and 2000 engageable with two positioning projections 1012 and positioning and fuse-fixing projections 1800 and 1801 of the ink container IT. It further includes projections 2500 and 2600 at its backside for the positioning relative to the carriage HC of the main assembly IJRA.

In addition, the supporting member 300 has a hole 320 through which an ink supply pipe 2200, which will be described hereinafter, is penetrated for supplying ink from the ink container. The wiring board 200 is mounted on the supporting member 300 by bonding agent or the like. The supporting member 300 is provided with recesses 2400 and 2400 adjacent the positioning projections 2500 and 2600.

Figure 5:
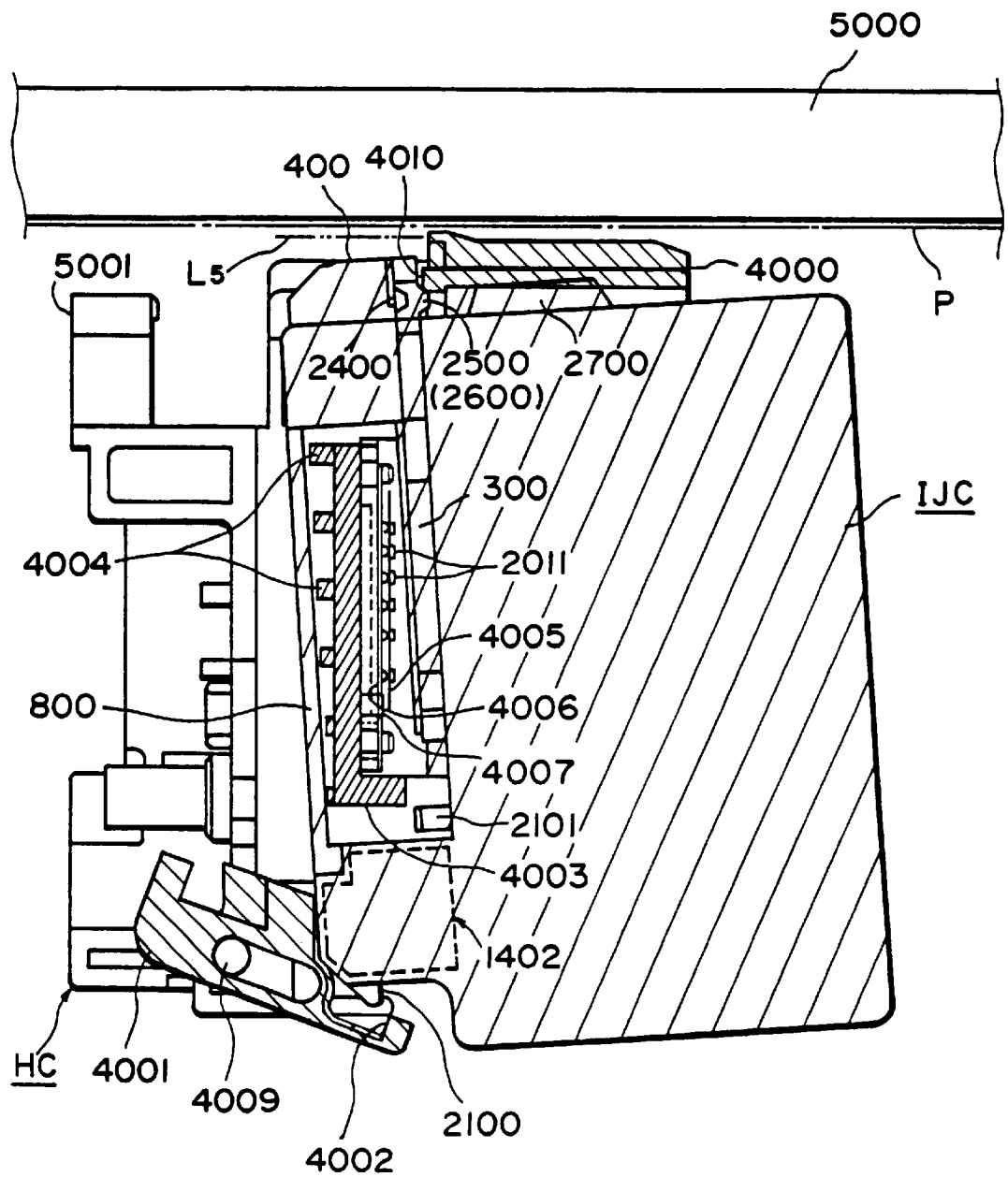
FIG. 5 is a top plan view illustrating the ink jet cartridge being mounted on the main assembly.

As shown in FIG. 3, the assembled ink jet cartridge IJC has a head projected portion having three sides provided with plural parallel grooves 3000 and 3001. The recesses 2400 and 2400 are located at extensions of the parallel grooves at the top and bottom sides to prevent the ink or foreign matter moving along the groove from reaching the projections 2500 and 2600. The covering member 800 having the parallel grooves 3000, as shown in FIG. 5, constitutes an outer casing of the ink jet cartridge IJC and cooperates with the ink container to define a space for accommodating the ink jet unit IJU. The ink supply member 600 having the parallel groove 3001 has an ink conduit pipe 1600 communicating with the above-described ink supply pipe 2200 and cantilevered at the supply pipe 2200 side. In order to assure the capillary action at the fixed side of the ink conduit pipe 1600 and the ink supply pipe 2200, a sealing pin 602 is inserted.

A gasket 601 seals the connecting portion between the ink container IT and the supply pipe 2200. A filter 700 is disposed at the container side end of the supply pipe. The ink supply member 600 is molded, and therefore, it is produced at low cost with high positional accuracy. In addition, the cantilevered structure of the conduit 1600 assures the press-contact between the conduit 1600 and the ink inlet 1500 even if the ink supply member 600 is mass-produced.

In this embodiment, the complete communicating state can be assuredly obtained simply by flowing sealing bonding agent from the ink supply member side under the press-contact state. The ink supply member 600 may be fixed to the supporting member 300 by inserting and penetrating backside pins (not shown) of the ink supply member 600 through the openings 1901 and 1902 of the supporting member 300 and by heat-fusing the portion where the pins are projected through the backside of the supporting member 300. The slight projected portions thus heat-fused are accommodated in recesses (not shown) in the ink jet unit (IJU) mounting side surface of the ink container IT, and therefore, the unit IJU can be correctly positioned.

(ii) Ink Container IT

The ink container comprises a main body 1000, an ink absorbing material and a cover member 1100. The ink absorbing material 900 is inserted into the main body 1000 from the side opposite from the unit (IJU) mounting side, and thereafter, the cover member 1100 seals the main body.

The ink absorbing material 900 is thus disposed in the main body 1000. The ink supply port 1200 functions to supply the ink to the ink jet unit IJU comprising the above-described parts 100–600, and also functions as an ink injection inlet to permit initial ink supply to the absorbing material 900 before the unit IJU is mounted to the portion 1010 of the main body.

In this embodiment, the ink may be supplied through an air vent port and this supply opening. In order to good supply of ink, ribs 2300 is formed on the inside surface of the main body 1000, and ribs 2301 and 2302 are formed on the inside of the cover member 1100, which are effective to provide within the ink container an ink existing region extending continuously from the air vent port side to that corner portion of the main body which is most remote from the ink supply opening 1200. Therefore, in order to uniformly distribute the ink in good order, it is preferable that the ink is supplied through the supply opening 1200. This ink supply method is practically effective. The number of the ribs 2300 in this embodiment is four, and the ribs 2300 extend parallel to a movement direction of the carriage adjacent the rear side of the main body of the ink container, by which the absorbing material 900 is prevented from closely contacted to the inner surface of the rear side of the main body. The ribs 2301 and 2302 are formed on the inside surface of the cover member 1100 at a position which is substantially an extension of the ribs 2300, however, as contrasted to the large rib 2300, the size of the ribs 2301 and 2302 are small as if it is divided ribs, so that the air existing space is larger with the ribs 2301 and 2302 than with the rib 2300. The ribs 2302 and 2301 are distributed on the entire area of the cover member 1100, and the area thereof is not more than one half of the total area. Because of the provisions of the ribs, the ink in the corner region of the ink absorbing material which is most remote from the supply opening 1200 can be stably and assuredly supplied to the inlet opening by capillary action. The cartridge is provided with an air vent port for communication between the inside of the cartridge with the outside air. Inside the vent port 1400, there is a water repellent material 1400 to prevent the inside ink from leaking outside through the vent port 1400.

The ink accommodating space in the ink container IT is substantially rectangular parallelopiped, and the long side faces in the direction of carriage movement, and therefore, the above-described rib arrangements are particularly effective. When the long side extends along the movement direction of the carriage, or when the ink containing space is in the form of a cube, the ribs are preferably formed on the entire surface of the inside of the cover member 1100 to stabilize the ink supply from the ink absorbing material 900. The cube configuration is preferable from the standpoint of accommodating as much as possible ink in limited space. However, from the standpoint of using the ink with minimum an available part in the ink container, the provisions of the ribs formed on the two surfaces constituting a corner.

In this embodiment, the inside ribs 2301 and 2302 of the ink container IT are substantially uniformly distributed in the direction of the thickness of the ink absorbing material having the rectangular parallelepiped configuration. Such a structure is significant, since the air pressure distribution in the ink container IT is made uniform when the ink in the absorbing material is consumed so that the quantity of the remaining unavailable ink is substantially zero. It is preferable that the ribs are disposed on the surface or surfaces outside a circular arc having the center at the projected position on the ink supply opening 1200 on the top surface of the rectangular ink absorbing material and having a radius which is equal to the long side of the rectangular shape, since then the ambient air pressure is quickly established for the ink absorbing material present outside the circular arc. The position of the air vent of the ink container IT is not limited to the position of this embodiment if it is good for introducing the ambient air into the position where the ribs are disposed.

In this embodiment, the backside of the ink jet cartridge IJC is flat, and therefore, the space required when mounted in the apparatus is minimized, while maintaining the maximum ink accommodating capacity. Therefore, the size of the apparatus can be reduced, and simultaneously, the frequency of the cartridge exchange is minimized. Utilizing the rear space of the space used for unifying the ink jet unit IJU, a projection for the air vent port 1401. The inside of the projection is substantially vacant, and the vacant space 1402 functions to supply the air into the ink container IT uniformly in the direction of the thickness of the absorbing material. Because of these features described above, the cartridge as a whole is of better performance than the conventional cartridge. The air supply space 1402 is much larger than that in the conventional cartridge. In addition, the air vent port 1401 is at an upper position, and therefore, if the ink departs from the absorbing material for some reason or another, the air supply space 1402 can tentatively retain the ink to permit such ink to be absorbed back into the absorbing material. Therefore, the wasteful consumption of the ink can be saved.

Figure 4:
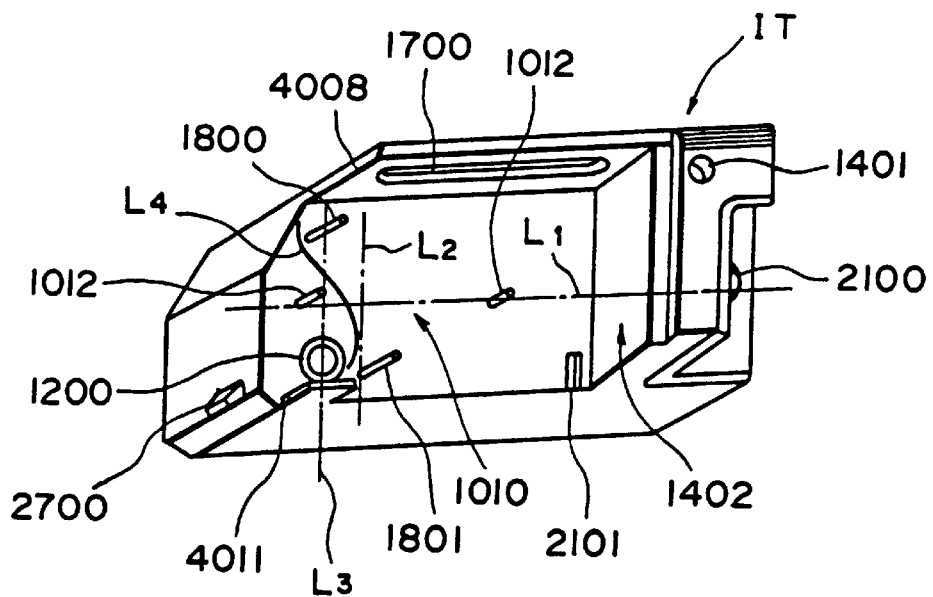
FIG. 4 is a perspective view of the ink container of the ink jet cartridge as seen from the side where the ink jet recording head is mounted on a recording apparatus.

Referring to FIG. 4, there is shown a structure of a surface of the ink container IT to which the unit IJU is mounted. Two positioning projections 1012 are on a line L1 which is a line passing through the substantial center of the array of the ejection outlets in the orifice plate 400 and parallel with the bottom surface of the ink container IT or the parallel to the ink container supporting reference surface of the carriage. The height of the projections 1012 is slightly smaller than the thickness of the supporting member 300, and the projections 1012 function to correctly position the supporting member 300. On an extension (right side) in this Figure, there is a pawl 2100 with which a right angle engaging surface 4002 of a carriage positioning hook 4001 is engageable. Therefore, the force for the positioning of the ink jet unit relative to the carriage acts in a plane parallel to a reference plane including the line L1. These relationships are significant, since the accuracy of the ink container positioning becomes equivalent to the positioning accuracy of the ejection outlet of the recording head, which will be described hereinafter in conjunction with FIG. 5.

Projections 1800 and 1801 corresponding to the fixing wholes 1900 and 2000 for fixing the supporting member 300 to the side of the ink container IT, are longer than the projections 1012, so that they penetrate through the supporting member 300, and the projected portions are fused to fix the supporting member 300 to the side surface. When a line L3 passing through the projection 1800 and perpendicular to the line L1, and a line L2 passing through the projection 1801 and perpendicular to the line L1, are drawn. The center of the supply opening 1200 is substantially on the line L3, the connection between the supply opening 1200 and a supply type 2200 is stabilized, and therefore, even if the cartridge falls, or even if a shock is imparted to the cartridge, the force applied to the connecting portion can be minimized. In addition, since the lines L2 and L3 are not overlapped, and since the projections 1800 and 1801 are disposed adjacent to that projection 1012 which is nearer to the ink ejection outlets of the ink jet head, the positioning of the ink jet unit relative to the ink container is further improved. In this Figure, a curve L4 indicates the position of the outer wall of the ink supply member 600 when it is mounted. Since the projections 1800 and 1801 are along the curve L4, the projections are effective to provide sufficient mechanical strength and positional accuracy against the weight of the end structure of the head IJH.

An end projection 2700 of the ink container IT is engageable with a whole formed in the front plate 4000 of the carriage to prevent the ink cartridge from being displaced extremely out of the position. A stopper 2101 is engageable with a unshown rod of the carriage HC, and when the cartridge IJC is correctly mounted with rotation, which will be described hereinafter, the stopper 2101 take a position below the rod, so that even if an upward force tending to disengage the cartridge from the correct position is unnecessarily applied, the correct mounted state is maintained. The ink container IT is covered with a cover 800 after the unit IJU is mounted thereto. Then, the unit IJU is enclosed therearound except for the bottom thereof. However, the bottom opening thereof permits the cartridge IJC to be mounted on the carriage HC, and is close to the carriage HC, and therefore, the ink jet unit is substantially enclosed at the six sides. Therefore, the heat generation from the ink jet head IJH which is in the enclosed space is effective to maintain the temperature of the enclosed space.

However, if the cartridge IJC is continuously operated for a long period of time, the temperature slightly increases. Against the temperature increase, the top surface of the cartridge IJC is provided with a slit 1700 having a width smaller than the enclosed space, by which the spontaneous heat radiation is enhanced to prevent the temperature rise, while the uniform temperature distribution of the entire unit IJU is not influenced by the ambient conditions.

After the ink jet cartridge IJC is assembled, the ink is supplied from the inside of the cartridge to the chamber in the ink supply member 600 through a supply opening 1200, the whole 320 of the supporting member 300 and an inlet formed in the backside of the ink supply member 600. From the chamber of the ink supply member 600, the ink is supplied to the common chamber through the outlet, supply pipe and an ink inlet 1500 formed in the top plate 1300. The connecting portion for the ink communication is sealed by silicone rubber or butyl rubber or the like to assure the hermetical seal.

In this embodiment, the top plate 1300 is made of resin material having resistivity to the ink, such as polysulfone, polyether sulfone, polyphenylene oxide, polypropylene. It is integrally molded in a mold together with an orifice plate portion 400.

As described in the foregoing, the integral part comprises the ink supply member 600, the top plate 1300, the orifice plate 400 and parts integral therewith, and the ink container body 1000. Therefore, the accuracy in the assembling is improved, and is convenient in the mass-production. The number of parts is smaller than inconventional device, so that the good performance can be assured.

In this embodiment, as shown in FIGS. 2–4, the configuration after assembly is such that the top portion 603 of the ink supply member 600 cooperates with an end of the top thereof having the slits 1700, so as to form a slit S, as shown in FIG. 3. The bottom portion 604 cooperates with fed side end 4011 of a thin plate to which the bottom cover 800 of the ink container IT is bonded, so as to form a slit (not shown) similar to the slit S. The slits between the ink container IT and the ink supply member 600 are effective to enhance the heat radiation, and is also effective to prevent an expected pressure to the ink container IT from influencing directly the supply member or to the ink jet unit IJT.

The above-described various structures are individually effective to provide the respective advantages, and also they are most effective when they are combined each other.

(iii) Mounting of the Ink Jet Cartridge IJC to the Carriage HC

In FIG. 5, a platen roller 5000 guides the recording medium P from the bottom to the top. The carriage HC is movable along the platen roller 5000. The carriage HC comprises a front plate 4000, a supporting plate 4003 for electric connection and a positioning hook 4001. The front plate 400 has a thickness of 2 mm, and is disposed closer to the platen. The front plate 4000 is disposed close to the front side of the ink jet cartridge IJC, when the cartridge IJC is mounted to the carriage. The supporting plate 4003 supports a flexible sheet 4005 having pads 2011 corresponding to the pads 201 of the wiring board 200 of the ink jet cartridge IJC and a rubber pad sheet 4007 for producing elastic force for urging the backside of the flexible sheet 4005 to the pads 2001. The positioning hook 4001 functions to fix the ink jet cartridge IJC to the recording position. The front plate 4000 is provided with two positioning projection surfaces 4010 corresponding to the positioning projections 2500 and 2600 of the supporting member 300 of the cartridge described hereinbefore. After the cartridge is mounted, the front plate receives the force in the direction perpendicular to the projection surfaces 4010. Therefore, plural reinforcing ribs (not shown) are extended in the direction of the force at the platen roller side of the front plate. The ribs project toward the platen roller slightly (approximately 0.1 mm) from the front side surface position L5 when the cartridge IJC is mounted, and therefore, they function as head protecting projections. The supporting plate 4003 is provided with plural reinforcing ribs 4004 extending in a direction perpendicular to the above-described front plate ribs. The reinforcing ribs 4004 have heights which decreases from the plate roller side to the hook 4001 side. By this, the cartridge is inclined as shown in FIG. 5, when it is mounted.

The supporting plate 4003 is provided with two additional positioning surfaces 4006 at the lower left portion, that is, at the position closer to the hook. The positioning surfaces 4006 correspond to projection surfaces 4010 by the additional positioning surfaces 4006, the cartridge receives the force in the direction opposite from the force received by the cartridge by the above-described positioning projection surfaces 4010, so that the electric contacts are stabilized. Between the upper and lower projection surfaces 4010, there is disposed a pad contact zone, so that the amount of deformation of the projections of the rubber sheet 4007 corresponding to the pad 2011 is determined. When the cartridge IJC is fixed at the recording position, the positioning surfaces are brought into contact with the surface of the supporting member 300. In this embodiment, the pads 201 of the supporting member 300 are distributed so that they are symmetrical with respect to the above-described line L1, and therefore, the amount of deformation of the respective projections of the rubber sheet 4007 are made uniform to stabilize the contact pressure of the pads 2011 and 201. In this embodiment, the pads 201 are arranged in two columns and upper and bottom two rows.

The hook 4001 is provided with an elongated whole engageable with a fixed pin 4009. Using the movable range provided by the elongated hole, the hook 4001 rotates in the counterclockwise direction, and thereafter, it moves leftwardly along the platen roller 5000, by which the ink jet cartridge IJC is positioned to the carriage HC. Such a movable mechanism of the hook 4001 may be accomplished by another structure, but it is preferable to use a lever or the like. During the rotation of the hook 4001, the cartridge IJC moves from the position shown in FIG. 5 to the position toward the platen side, and the positioning projections 2500 and 2600 come to the position where they are engageable to the positioning surfaces 4010. Then, the hook 4001 is moved leftwardly, so that the hook surface 4002 is contacted to the pawl 2100 of the cartridge IJC, and the ink cartridge IJC rotates about the contact between the positioning surface 2500 and the positioning projection 4010 in a horizontal plane, so that the pads 201 and 2011 are contacted to each other. When the hook 4001 is locked, that is retained at the fixing or locking position, by which the complete contacts are simultaneously established between the pads 201 and 2011, between the positioning portions 2500 and 4010, between the standing surface 4002 and the standing surface of the pawl and between the supporting member 300 and the positioning surface 4006, and therefore, the cartridge IJC is completely mounted on the carriage.

(iv) General Arrangement of the Apparatus

Figure 6:
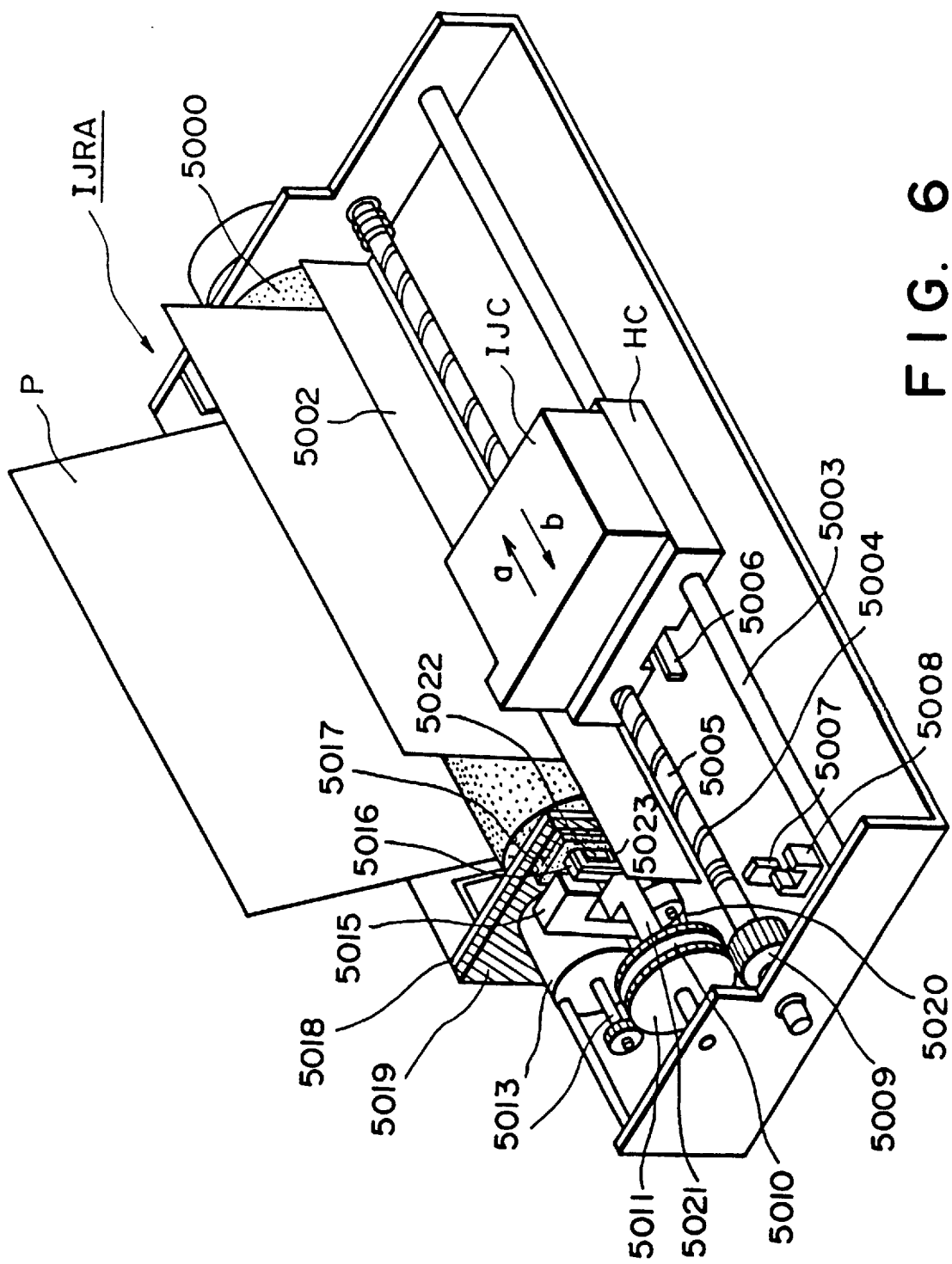
FIG. 6 is a perspective view of the ink jet recording apparatus.

FIG. 6 is a perspective view of an ink jet recording apparatus IJRA in which the present invention is used. A lead screw 5005 rotates by way of a drive transmission gears 5011 and 5009 by the forward and backward rotation of a driving motor 5013. The lead screw 5005 has a helical groove 5004 with which a pin (not shown) of the carriage HC is engaged, by which the carriage HC is reciprocable in directions a and b. A sheet confining plate 5002 confines the sheet on the platen over the carriage movement range. Home position detecting means 5007 and 5008 are in the form of a photocoupler to detect presence of a lever 5006 of the carriage, in response to which the rotational direction of the motor 5013 is switched. A supporting member 5016 supports the front side surface of the recording head to a capping member 5022 for capping the recording head. Sucking means 5015 functions to suck the recording head through the opening 5023 of the cap so as to recover the recording head.

A cleaning blade 5017 is moved toward front and rear by a moving member 5019. They are supported on the supporting frame 5018 of the main assembly of the apparatus. The blade may be in another form, more particularly, a known cleaning blade. A lever 5021 is effective to start the sucking recovery operation and is moved with the movement of a cam 5020 engaging the carriage, and the driving force from the driving motor is controlled by known transmitting means such as clutch or the like.

The capping, cleaning and sucking operations can be performed when the carriage is at the home position by the lead screw 5005, in this embodiment. However, the present invention is usable in another type of system wherein such operations are effected at different timing. The individual structures are advantageous, and in addition, the combination thereof is further preferable.

Figure 1:
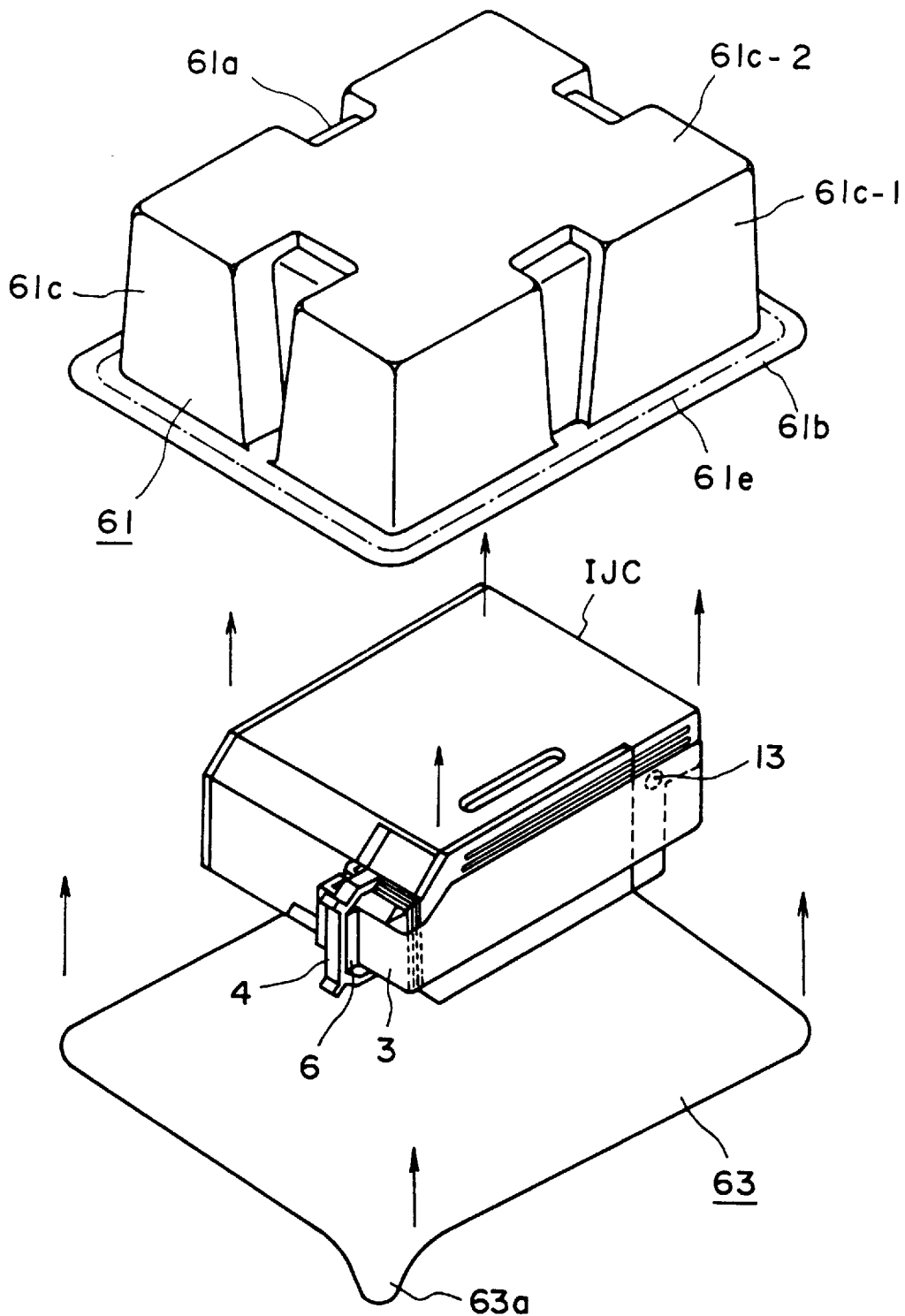
FIG. 1 is a developed perspective view of a package for containing the ink jet recording cartridge.

Referring to FIGS. 1 and 7, the package of the ink jet recording cartridge will be described, wherein there are provided a sealing member for closing the ejection outlets, the electric contacts or the air vent (or ink ejection outlet covering member) and an urging member for urging applying pressure to the sealing member, by which manner the ejection outlets and the air vent are closed before use (non-recording).

Figure 13A:
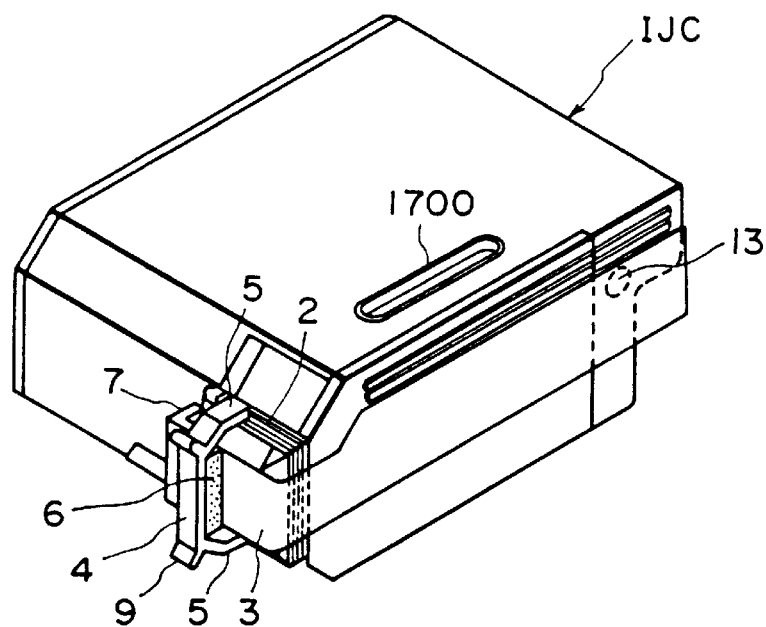
FIGS. 13A and 13B are a perspective view and a partial exploded view illustrating sealing and air vent.
Figure 13B:
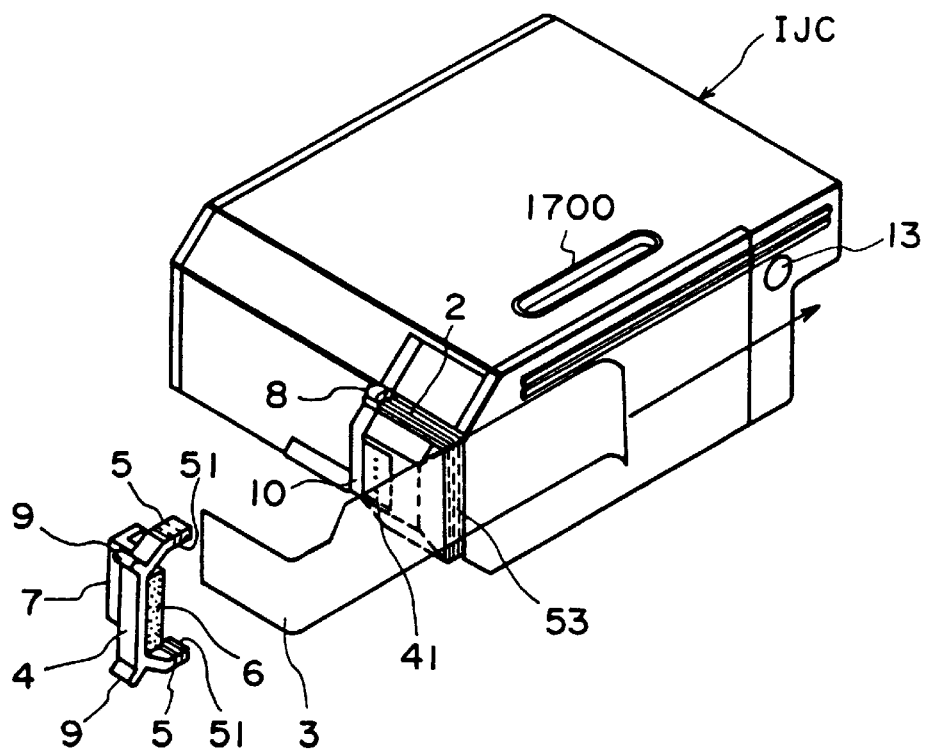

The description will first be made in conjunction with FIGS. 1, FIGS. 13A and 13B. FIG. 13A illustrates the ink jet cartridge IJC having the structure described above. FIG. 13B shows the state wherein a sealing member 3 and a cap 4 (urging member) are removed from the cartridge IJC. FIG. 1 shows an example of a package for the ink jet cartridge IJC.

Figure 16:
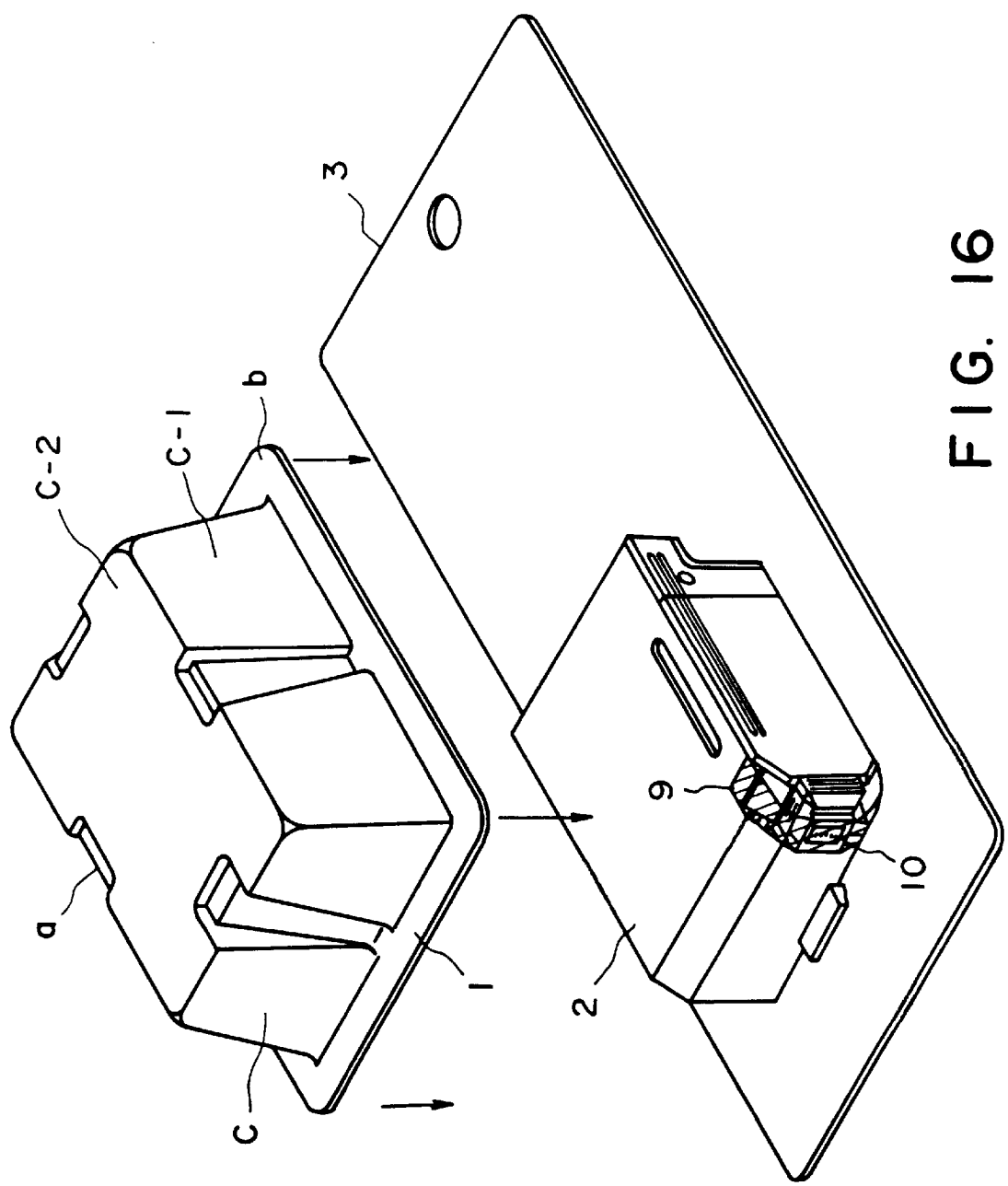
FIG. 16 is a developed perspective view illustrating the state of use of the package.

FIG. 16 shows the packed state.

Figure 8:
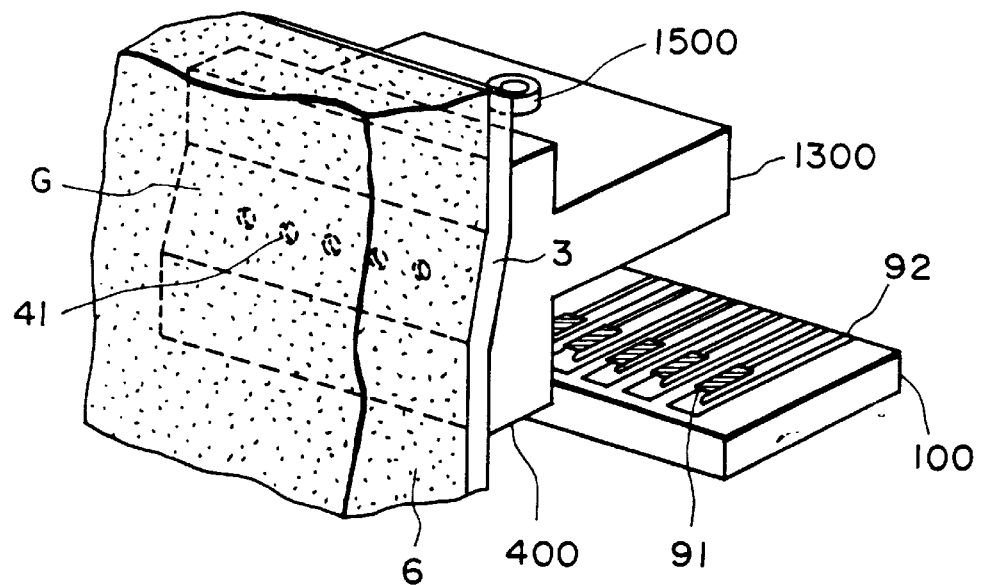
FIG. 8 is a partial exploded view illustrating another embodiment of the present invention.
Figure 9:
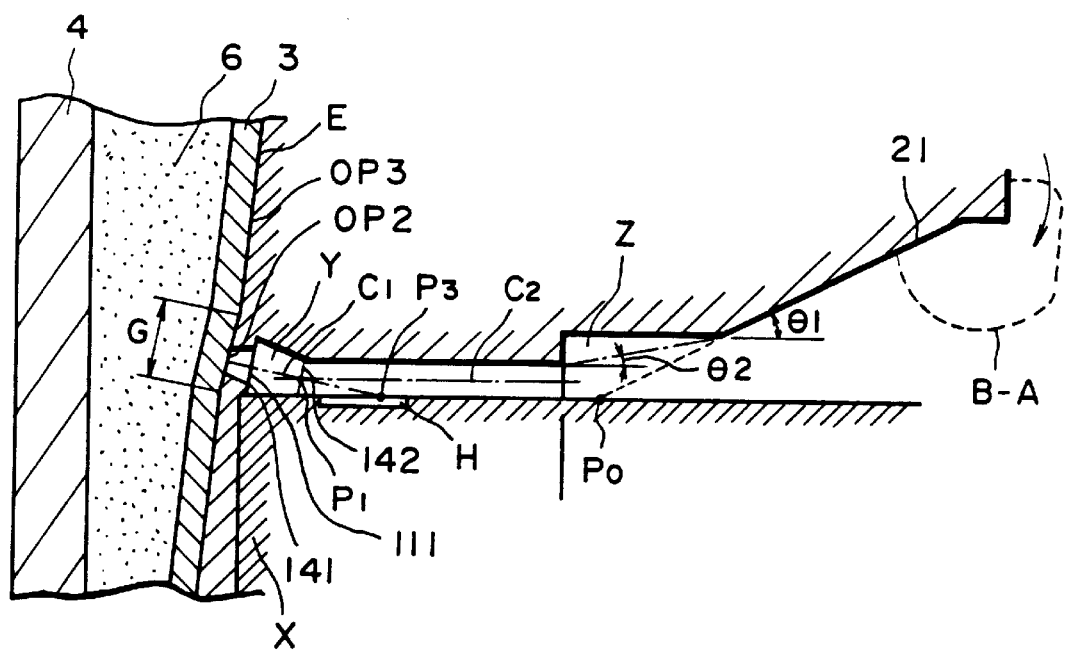
FIG. 9 is a sectional view of the recording head of FIG. 8.

FIGS. 8 and 9 show the recording head.

In FIG. 13A, the ink jet cartridge IJC has integral recording head and ink container. The ink container contains an ink absorbing material therein, and supplied ink to the recording head. The recording head is provided with thermal energy generating elements 91 as shown in FIG. 8, a base plate 100 on which electric contact 92 are formed and an orifice plate 400 having plural ejection outlets. In this embodiment, the top plate 1300 with grooves for defining a part of the liquid passages is integral with the orifice plate 400 by the molding. Reference numeral S designates an opening through which the electric contact can be observed, and is disposed in the top surface of the recording head. Reference numeral 10 designates an aluminum plate having an integral positioning portion 8 engageable with a positioning portion 4010 of the carriage of the main assembly of the recording apparatus for the positioning of the entire recording head. Reference numeral 1 designated an ejection side surface including the orifice plate 400. Reference numeral 41 designates ink ejection surface. In this Figure, an opening for absorbing backward wave during the recording or another opening such as a dummy nozzle, are not shown. Such an opening or openings may be formed in the ejection side surface 1. Reference numeral 2 designates grooves formed on the top and bottom side behind the ejection side surface, in this embodiment, four of such a grooves are formed. Reference numeral 53 designates side grooves formed at a side faced to the base plate 10, and four of such grooves are provided connecting the grooves 2. When the scattered ink is accumulated in the groove 2, the side grooves can guide it to the bottom. The grooves 2 of the recording head are effective to maintain engagement with a cap 4 by elastic force at the grooves 51.

Reference numeral 3 designates a sealing sheet and has a size entirely covering the ejection side surface of the recording head and extends to the air vent to completely cover it.

The sealing sheet 3 is bonded by a bonding agent or a bonding agent layer (on the sheet) at the side surface of the cartridge IJC and the portion around the air vent opening 13.

As shown in FIG. 13A, the cap 4 has a width corresponding to the ejection side surface 1 and is provided with opposite arms 5 and 5, an elastic member away from the arms and fixed to the inside thereof, an elastic deformation limiting portion 7 provide at a side thereof toward the base plate 10 for the purpose of positioning, and projections 9 and 9 to be used when the cap 4 is mounted to or demounted from the recording head. These portions are integral together. The arms 5 and 5 each have three grooves 51 on its inside surface, which is engageable with the above-described grooves 2. As will be understood from FIGS. 13B and 14C, in this embodiment, seal 3 is extended to the base plate 10, and simultaneously, an elastic member 6 is faced to the base plate. By doing so, the sealing effect to the ejection outlets 41 is enhanced, since it is close to the base plate 10. The limiting portion 7 has such a length that when the cap 4 is mounted on the recording head, the backside of the base plate 10 is lightly contacted thereto. The degree of contact is approximately 1 mm. By the simple structure described above, the elastic member 6 of the cap 4 is correctly positioned to be urged to the base plate by the functions of the arms 5 and 5 and the limiting portion 7. Thus, the sealing effect for the opening can be provided with the simple structure and without the problem arising from the use of the bonding agent.

The description will be made as to the engagement between the grooves 2 and 51. Upon the mounting, the projections 9 and 9 are nipped toward each other, the arms 5 and 5 expand therebetween by the elastic deformation. With the expansion, the recording head is disposed between the arms of the cap, and then, the projections 9 and 9 are released, by which the grooves 2 and the grooves 51 are engaged with each other. Even if the position is deviated by one groove at this time, the adjustment is easy by the balance between the elastic force of the arms and the elastic force resulting from the deformation of the elastic member 6. Then, when the same number of grooves are engaged, the entire balance is proper, and therefore, the sealing effect is good with the proper pressure distribution for the sealing. Thus, the good sealing can be provided. The material and thickness of the elastic member 6 is such that the sheet 3 is urged to provide sufficient sealing effect when the grooves 2 and 51 are engaged.

In this embodiment, the sheet 3 is made of polyethylene terephthalate or tetrafluoroethylene resin having a thickness of 12–30 microns and having flexibility. The elastic member 6 is made of sponge having a thickness of 3 mm, it may be silicone sponge or polyurethane sponge. The above materials are not limiting.

Referring to FIGS. 8 and 9 shows another embodiment wherein the ejection side surface has stepped surface portions having height of approximately 30 microns and a continuing surface portion having a height of approximately 70 microns. The present invention is conveniently applicable to such a stepped surface with assured sealing effect.

Referring to FIG. 9, there is shown a further embodiment wherein a common chamber has a zone Z connecting from the liquid passage and expanding toward an ink receptor (rightward) and a slanted surface 21 extending from the ink receptor to the region. An extension of the slanted surface 21 abuts the surface of the base plate 100 at a point Po, which is the surface on which the ejection energy generating means H is disposed. In this embodiment, the slanted surface is inclined relative to the center line C2 of the ink passage or the extension of the liquid passage by approximately 22 degrees, and the lateral walls are inclined by an angle of 15 degrees (B).

By the provision of the expanding zone Z, fine bubbles can be concentrated here, and the concentrated bubbles are retained at a position away from the extension of the liquid passage having the ejection energy generating means H. By the remote position alone, the bubbles can be guided away from the liquid passage. Therefore, even if the bubbles are developed into a large bubble, the ink supply is not prevented for a relatively long period of time. Therefore, the occurrence of the improper recording can be significantly delayed. In addition, the extension of the slanted surface crosses the base plate 100, and therefore, even if the bubble moves along the slanted surface toward the liquid passage, the base plate impedes the movement, and therefore, the large bubble does not enter the liquid passage. The angles are not limiting.

The structure which will be described in the following is particularly effective when the recovery operation is effected by sucking the ink, but is also usable when the recovery is effected by pressurizing. Reference numeral 41 designates a symmetric trapezoidal configuration of the opening of the liquid passage at the orifice plate side. Reference numeral 111 designates the symmetric trapezoidal configuration of the inside part of the ejection outlet in the orifice plate. In this embodiment, the cross-section of the liquid passage and the ejection outlet continuing thereto are all symmetrical trapezoidal. The long side of the trapezoid corresponds to the provision of the ejection energy generating means. By doing so, the dispersion of the bubbles in the liquid can be made non-uniform, by which the bubbles are concentrated toward the short side of the trapezoid, in addition, the course of the bubble ejection upon recovery operation can be concentrated, so that the bubble discharging effects can be enhanced. The short side of the liquid passage trapezoid corresponds to the short side of the ejection outlet, and the long side correspond to the long side, by doing so production of turbulent flow of the ink upon recovery operation can be minimized, so that the bubble discharging effect can be stabilized. The symmetric trapezoidal configuration is particularly preferable.

In this embodiment, there are a first region which is expanding adjacent the ejection outlet with the symmetrical trapezoidal configuration maintained (the region from line P1 to the openings 141 and 111) and a second region converging with the symmetric trapezoidal configuration maintained and continuing to the symmetric trapezoidal ejection outlet. By doing so, the turbulent flow of the ink does not occur, and therefore, the bubbles can be assuredly removed. Further, in this embodiment, in FIG. 9, the first and second regions have symmetricity about a plane (line C1) formed by connecting the sides of the symmetric trapezoid, and therefore, the pressure distribution upon the recovery operation can be made uniform, and therefore, eddy flow can be suppressed upon the recovery operation. In addition, an extension of the line C1 crosses at a point P3 with the surface on which the heat generating element is provided, and therefore, the ejection energy is efficiently used for the ejection of the ink.

The present invention is usable with an ink jet recording head, wherein the top plate and the base plate are clamped by the clamping member applying a line pressure to one of them, thus clamping them.

In further embodiment, the orifice plate has three surfaces OP1, OP2 and OP3 divided by the lines H and I. The direction of the liquid droplet ejection is stabilized on an extension of the line C1, and therefore, the recording surface is perpendicular to the line C1. In this example, the recording sheet moves upwardly. Since the orifice plate has a stepped surface with small inclination, and therefore, the ejection side surface can be cleaned in good order by wiping the surface. In addition, the retraction of the meniscus of the ink at the ejection outlet which can occur at the timing of the capping operation, can be prevented. Therefore, various problems arising from the improper ink ejection and other problems therefrom can be solved by the simple structure.

In FIG. 9, the height of the zone Z is preferably the same as or smaller than the height of the liquid passage, and the angle θ2 of the zone Z is 10 degrees. It is preferably not more than one half of the angle θ1 of the slanted surface 21.

As will be understood from FIG. 9, the ejection side surface and the peripheral surface thereof are assuredly sealed by the sheet 3, and the sealing is assured by the elastic deformation of the elastic member 6, and the sealing effects are sufficient.

In addition, the air vent opening 13 of the cartridge IJC, is sealed by the same sheet 3, and therefore, the evaporation of the ink component is prevented.

Referring to FIG. 1, a package for the ink jet cartridge will be described. The package includes the main body 61 and a cover 63, and they constitute a package.

The main body of the package 61 includes walls 61c maintained away from the object (ink jet cartridge IJC), recesses 61a projecting inwardly from the walls 61c toward the ink jet cartridge IJC to support it at a fixed position, and a flange 61b for connection with the cover 63. The ejection outlets of the ink jet cartridge IJC are maintained out of contact with the wall. As shown in this Figure, that one of the four recesses 61a which accommodates the ejection outlets has a larger depth, by which the ejection outlets are more inside in the package, so that the ejection outlets can be more securely protected. In addition, the users are prevented from inserting the ink jet cartridge the other way around.

The material and the dimensions of the walls 61c are so selected that it has sufficient strength. The thickness thereof is dependent on the material, but it is not less than 0.1 mm, preferably not less than 0.3 mm, further preferably not less than 0.5 mm, and not more than 1.2 mm, for example.

On the other hand, the material defining the recesses 61a is preferably such that it has flexibility to absorb the shock for the protection of the content. If the material defining the recesses 61a is the same as the material of the wall 61c having the same strength and rigidity, the impact received by the walls 61c tends to directly transmits to the content with the possible result of damage thereto. From this standpoint, the material of the recess 61a has a smaller thickness and exhibits elasticity. It is generally not more than 0.8 mm, and preferably not more than 0.6 mm, further preferably not more than 0.4 mm, the lower limit is, for example, 0.05 mm.

For the main body 61, various resin materials are usable. The main body 61 may be integrally molded with resin material. The integral molding is advantageous in the formability and manufacturing cost or the like.

For the integral molding of the main body 61, injection molding and vacuum molding for the resin material is usable. Among them, the injection molding with ABS resin, polystyrene, polypropylene, polyethylene, polyethylene terephthalate or other resin material, is preferable because the adjustment of the thickness of the wall 61c and the recess defining material 61a and because the relatively low cost thereof.

By the provision of the flange 61b, the main body can be easily bonded to the bottom plate 63. The flange 61b may be integrally molded with the main body 61. The thickness of the flange 61b may be equivalent to that of the wall 61c. The flange 61b is preferably provided with a rib 61e along the bonding region 62 with the covering member 63 for the purpose of reinforcement. The rib 61e is projected toward the cover 63, but the direction of the projection may be reversed. However, the former is preferable from the standpoint of assuring the bonding between the main body 61 and the cover 63.

The corners of the main body are preferably rounded as shown in the Figure to ease the shock thereto. The radius of the curvature of the roundings is preferably relatively large, and is determined in accordance with the size of the recess 61a, but is not less than 2 mm, for example, preferably not less than 3 mm, and more preferably not less than 5 mm. The configuration of the recess 61a is properly determined by one skilled in the art so that the ink cartridge IJC is protected and is effectively fixed in the package. In the shown example, the ink cartridge IJC is supported by the four recesses 61a, but the number thereof may be changed.

The clearance between the supporting portion of the recesses 61a of the ink jet cartridge and the ink jet cartridge is for example 0.5–3 mm, preferably 0.5–2 mm.

The material and thickness of the cover 63 is properly selected by one skilled in the art in consideration of the weight of the ink jet cartridge or an intended strength. The cover 63 is made of resin or metal film, sheet or plate or a laminated structure including at least one of the above.

The joining between the main body 61 and the cover 63 after the ink jet cartridge IJC is contained in the main body 61, with various methods. For example, the cover 63 may be made of the same material as the main body 61, and they are joined by heat-fusing or by ultrasonic fusing. An easy-peel layer may be applied on the joining region of the bottom plate 63, and they can be bonded using it.

When the main body 61 is made of polypropylene material and is produced by vacuum molding, the corners may be rounded as described in the foregoing. By doing so, the humidity maintaining function can be provided, in addition to the advantage described hereinbefore.

A mail die method is usable wherein the portion of blank sheet other than the portion constituting into the top part 61c-2 is extended by vacuum toward the bottom surface (flange 61b), to form the recesses 61a, the side surface 61c-1 of the wall 61c and the curved portion. Then, the thickness of the various parts can be made uniform without pin holes then, the content can be protected from moisture absorption.

Figure 15A:
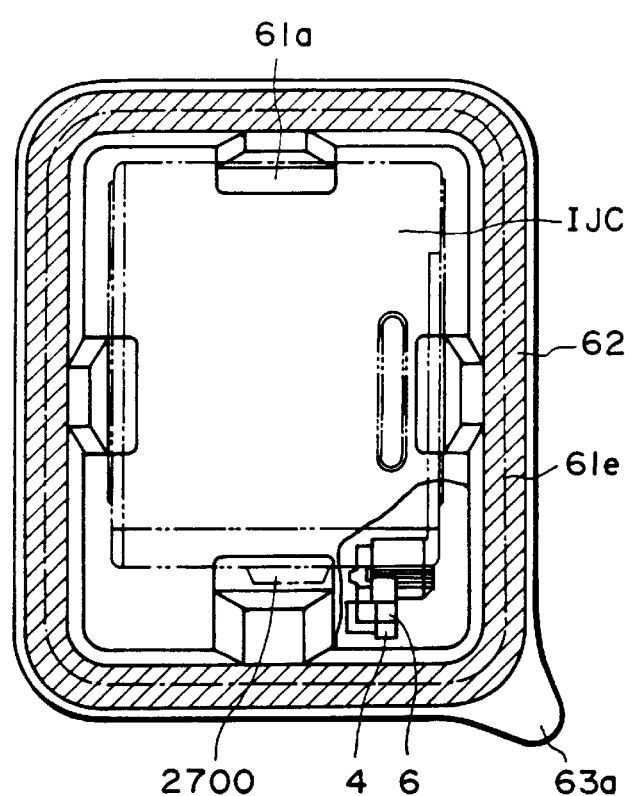
FIG. 15A, 15B and 15C are a top plan view, a front view and light side view of an example of a package according to an embodiment of the present invention.
Figure 15C:
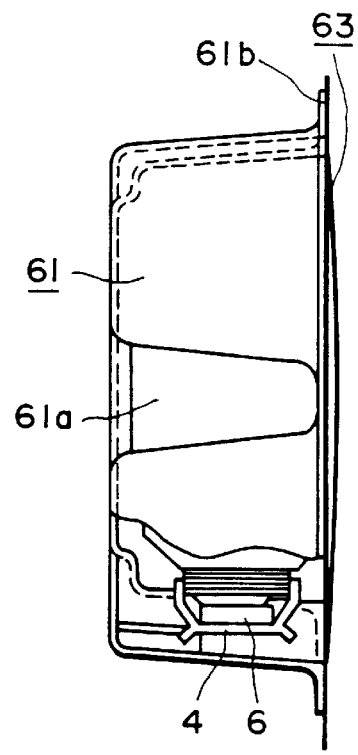
Figure 15B:
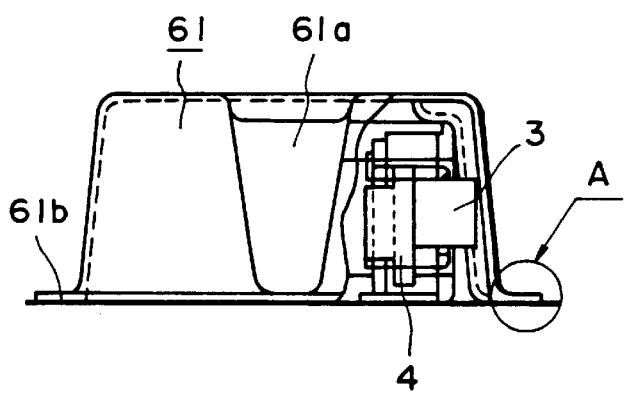
Figure 15D:
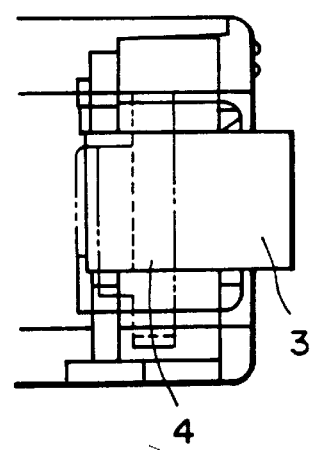
FIG. 15D is a partial enlarged view illustrating the state around the ejection outlets of the ink jet cartridge.

Referring to FIGS. 15A, 15B, 15C and 15D, there are shown the package as a view from the top (FIG. 15A), as a view from the front side (FIG. 15B) and as a view from the right side (FIG. 15C) and as an enlarged view (FIG. 15D).

In the foregoing embodiment, the air vent opening and the ejection outlets are sealed by the same sealing member, and an urging (elastic) member assures the sealing at the ejection outlets.

In this embodiment, the connection between the sealing member and the ejection outlets is preferably made with a bonding agent, but it is not inevitable.

Figure 11:
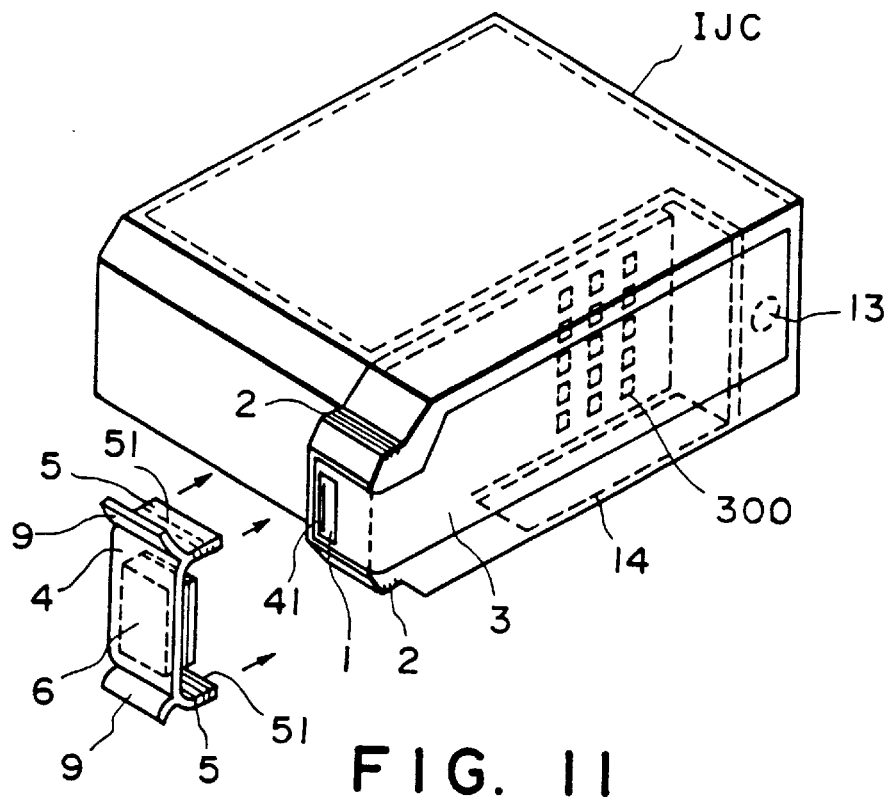
FIGS. 11 and 12 are perspective view of a cap and a recording head according to a further embodiment of the present invention.
Figure 12:
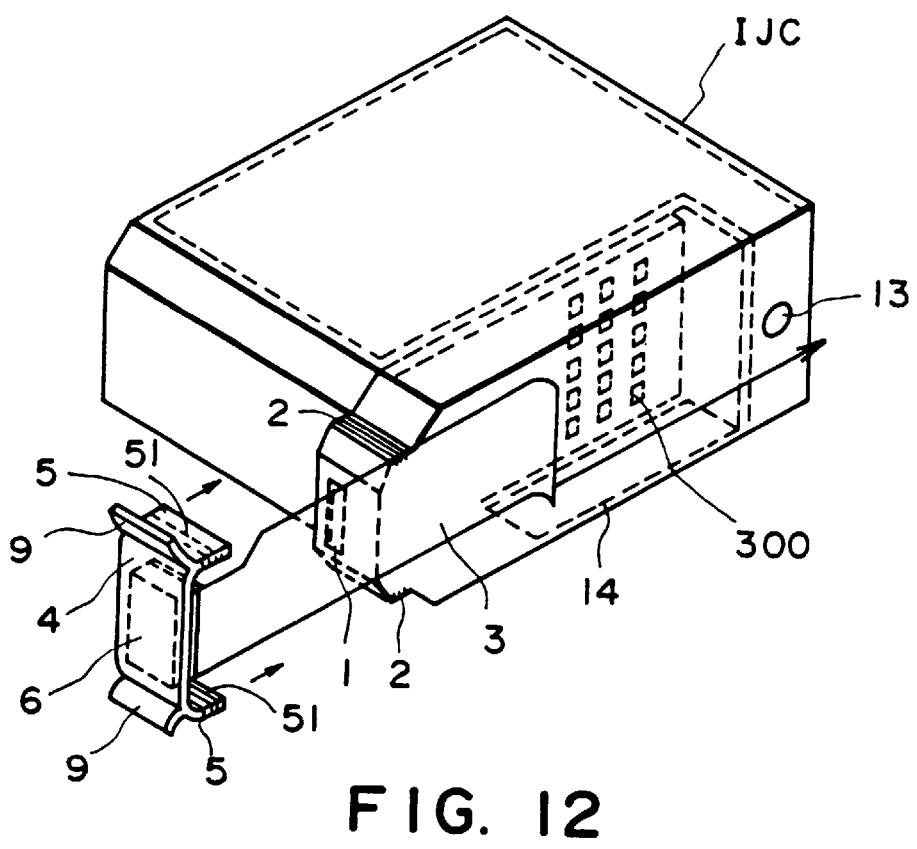

FIGS. 11 and 12 show a modification. In FIG. 11, the projections 9, the arms 5 and 5 and the elastic member 6 of the cap 4 of the urging member has a size corresponding to the entirety of the head portion. Then, the mounting condition of the cap 4 is improved. In this case, the engaging length between the grooves 51 and 2 is increased, and therefore, the mounting and dismounting of the cap 4 can be effected by sliding it in the direction in which the grooves 2 extend. In FIG. 12, the cap 4 itself has a seal 3 and the elastic material 6 as a unit. The sealing member 3 may be in any form if it seals the air vent opening 13 and the ejection outlets 41. Preferably, the sealing member may be peeled so that the air vent opening is first opened, and then, the ejection outlets are opened, as shown in FIG. 14.

FIG. 7 the sealing member of FIG. 14 is provided only to the ejection outlets 41. This is effective to provide the sealing effect only to the ejection outlet 41. The sealing member 3 is preferably long enough to permit easy peeling toward a side of the cartridge beyond the head portion (FIG. 15D).

Figure 10:
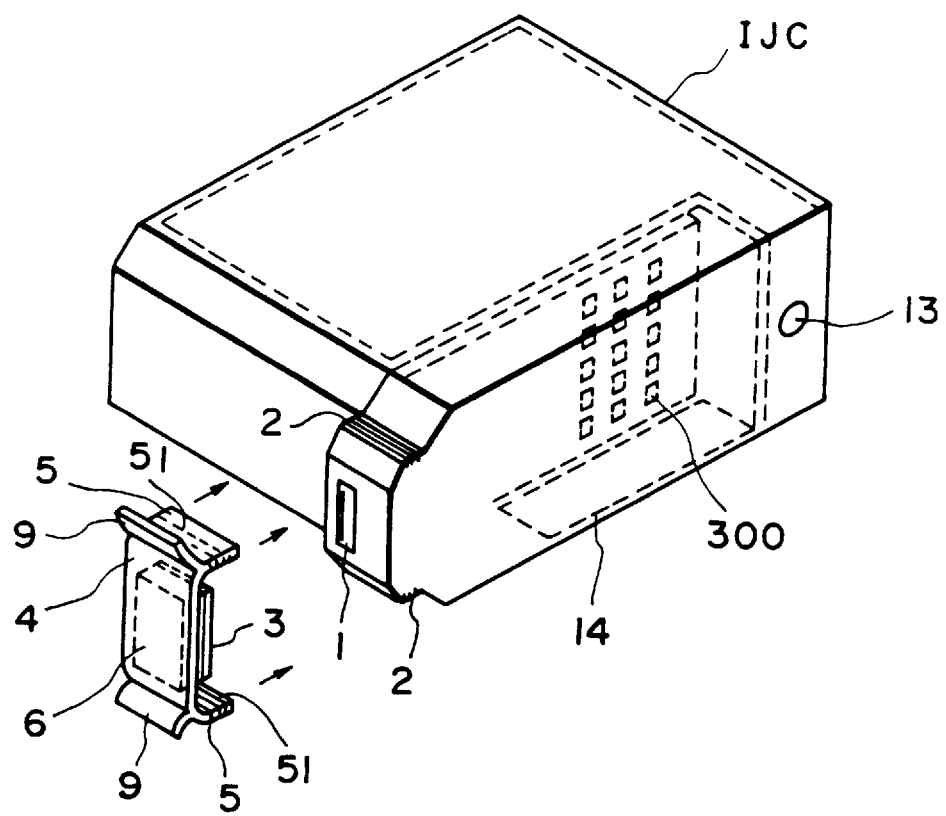
FIG. 10 is a perspective view of a modified recording head.

FIG. 10 shows an embodiment wherein the cap of FIG. 11 seals only the ejection outlets. In this embodiment, the sealing member 3 and the elastic member 6 are made integral and having a size covering the entire head portion. According to this embodiment, the sealing effect relative to the ejection outlets are maintained, and the operativity is improved. With this structure, when the cartridge is not used and taken out of the apparatus, the cap may be used as before the use and for the same purpose.

Figure 17:
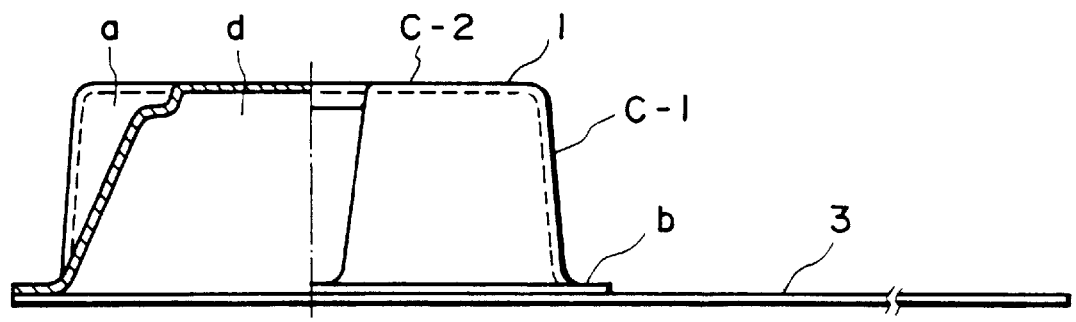
FIG. 17 is a side view illustrating the joint between the container and the bottom plate in FIG. 16.

FIGS. 16 and 17 shows the state of the package when it is soled. The hole 65 of the cover 64 is provided to permit insertion of a pin. The ejection outlet side of the cartridge IJC is away from the hole 65. Therefore, when the package is in the store, the ejection side is at the bottom, and the air vent opening is in the middle, and the hole 65 is at the top. At this time, the ejection outlets are sealed by the cap or the sealing member, and the air vent hole is sealed, preferably. However, if it is left for a few years, the water evaporates through the air vent. However, in the above-described suspended state, the ink is urged to the ejection outlet 41 side by the gravity, and therefore, the bubble or bubbles produced by the evaporation are prevented from being concentrated to the ejection outlet side. Therefore, the package and the packing method is preferable in consideration of a long term storage.

In FIG. 17, the package is equivalent to that shown in FIG. 1. In this embodiment, the thickness of the wall c is not less than 0.1 mm, preferably not less than 0.3 mm, further preferably not less than 0.5 mm, and the upper limit is 1.2 mm.

The recess a has a smaller thickness and exhibits elasticity. The thickness of the material defining the recesses a has a thickness not more than 0.8 mm, preferably not more than 0.6 mm, further preferably not more than 0.4 mm.

Figure 18:
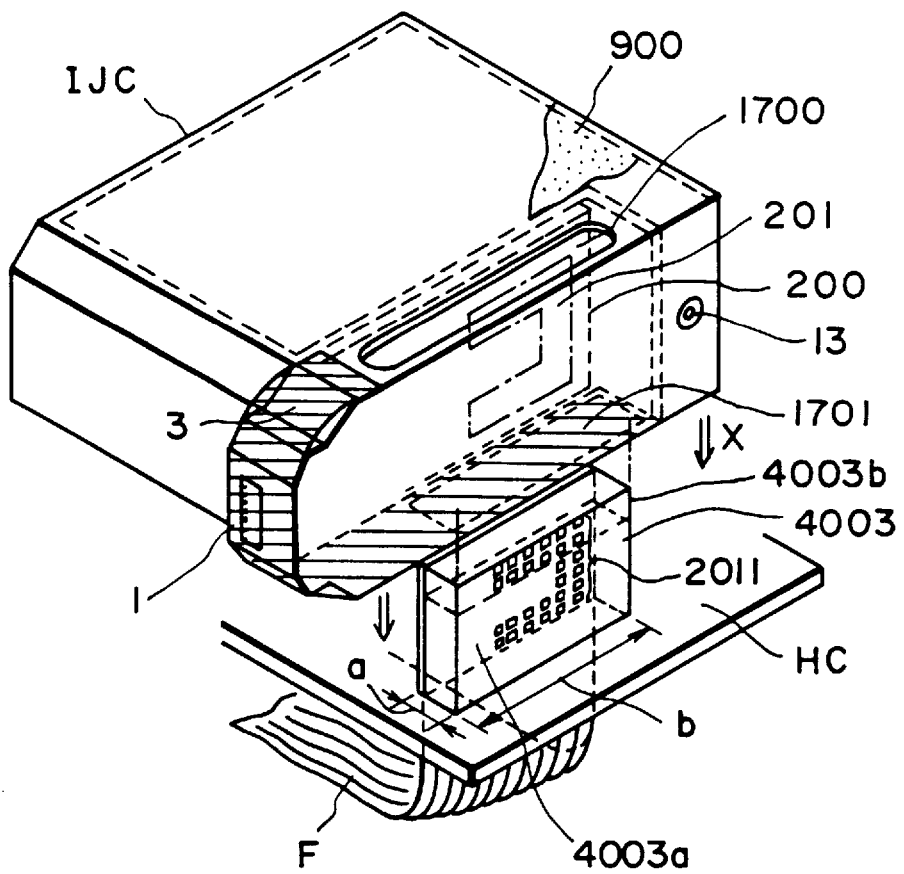
FIG. 18 is a perspective view illustrating the mounting of the ink jet cartridge of FIG. 2 on the carriage of FIG. 5.

FIG. 18 shows a further embodiment, wherein the sealing member 3 seals not only the ejection outlets but also protects electric contact 201. Reference character F designates a flexible cable for the electric wiring and is connected with the electric contacts 2001 of a connector projection 4003 of the head carriage Hc. The opening 1701 of the recording head has a size enough to accommodate the projection 4003 (a×b). The opening 1700 in the top of the head is smaller than it. Therefore, it is preferable to protect the opening 1701 by the seal.

The ink jet cartridge IJC is mounted to the printer carriage Hc, so that the connector projection 4003 is inserted through the opening 1701. At this time, the opening 1701 is provided with the protection tape 3 which is the same as the tape protecting the ejection outlets. Therefore, it is required to be mounted after the tape is peeled off. Therefore, the users are prevented from forgetting to peel the seal. Since the protection of the contacts is accomplished by the same sealing member as the sealing member for the ejection outlets, and therefore, the forgetting of pealing the seal can be substantially notified by the failure of the recording operation. Thus, the use of the same seal is effective to warn the operator of various malfunctions.

The present invention is particularly suitable for use in a bubble jet recording head and recording apparatus developed by Canon Kabushiki Kaisha, Japan. This is because, the high density of the picture element, and the high resolution of the recording are possible.

The typical structure and the operational principle of preferably the one disclosed in U.S. Pat. Nos. 4,723,129 and 4,740,796. The principle is applicable to a so-called on-demand type recording system and a continuous type recording system particularly however, it is suitable for the on-demand type because the principle is such that at least one driving signal is applied to an electrothermal transducer disposed on a liquid (ink) retaining sheet or liquid passage, the driving signal being enough to provide such a quick temperature rise beyond a departure from nucleation boiling point, by which the thermal energy is provide by the electrothermal transducer to produce film boiling on the heating portion of the recording head, whereby a bubble can be formed in the liquid (ink) corresponding to each of the driving signals. By the development and collapse of the the bubble, the liquid (ink) is ejected through an ejection outlet to produce at least one droplet. The driving signal is preferably in the form of a pulse, because the development and collapse of the bubble can be effected instantaneously, and therefore, the liquid (ink) is ejected with quick response. The driving signal in the form of the pulse is preferably such as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600 wherein the heating portion is disposed at a bent portion in addition to the structure of the combination of the ejection outlet, liquid passage and the electrothermal transducer as disclosed in the above-mentioned patents. In addition, the present invention is applicable to the structure disclosed in Japanese Laid-Open Patent Application Publication No. 123670/1984 wherein a common slit is used as the ejection outlet for plural electrothermal transducers, and to the structure disclosed in Japanese Laid-Open Patent Application No. 138461/1984 wherein an opening for absorbing pressure wave of the thermal energy is formed corresponding to the ejecting portion. This is because, the present invention is effective to perform the recording operation with certainty and at high efficiency irrespective of the type of the recording head.

The present invention is effectively applicable to a so-called full-line type recording head having a length corresponding to the maximum recording width. Such a recording head may comprise a single recording head and a plural recording head combined to cover the entire width.

In addition, the present invention is applicable to a serial type recording head wherein the recording head is fixed on the main assembly, to a replaceable chip type recording head which is connected electrically with the main apparatus and can be supplied with the ink by being mounted in the main assembly, or to a cartridge type recording head having an integral ink container.

The provision of the recovery means and the auxiliary means for the preliminary operation are preferable, because they can further stabilize the effect of the present invention. As for such means, there are capping means for the recording head, cleaning means therefor, pressing or sucking means, preliminary heating means by the ejection electrothermal transducer or by a combination of the ejection electrothermal transducer and additional heating element and means for preliminary ejection not for the recording operation, which can stabilize the recording operation.

As regards the kinds of the recording head mountable, it may be a single corresponding to a single color ink, or may be plural corresponding to the plurality of ink materials having different recording color or density. The present invention is effectively applicable to an apparatus having at least one of a monochromatic mode mainly with black and a multi-color with different color ink materials and a full-color mode by the mixture of the colors which may be an integrally formed recording unit or a combination of plural recording heads.

Furthermore, in the foregoing embodiment, the ink has been liquid. It may be, however, an ink material solidified at the room temperature or below and liquefied at the room temperature. Since in the ink jet recording system, the ink is controlled within the temperature not less than 30° C. and not more than 70° C. to stabilize the viscosity of the ink to provide the stabilized ejection, in usual recording apparatus of this type, the ink is such that it is liquid within the temperature range when the recording signal is applied. In addition, the temperature rise due to the thermal energy is positively prevented by consuming it for the state change of the ink from the solid state to the liquid state, or the ink material is solidified when it is left is used to prevent the evaporation of the ink. In either of the cases, the application of the recording signal producing thermal energy, the ink may be liquefied, and the liquefied ink may be ejected. The ink may start to be solidified at the time when it reaches the recording material. The present invention is applicable to such an ink material as is liquefied by the application of the thermal energy. Such an ink material may be retained as a liquid or solid material on through holes or recesses formed in a porous sheet as disclosed in Japanese Laid-Open Patent Application No. 56847/1979 and Japanese Laid-Open Patent Application No. 71260/1985. The sheet is faced to the electrothermal transducers. The most effective one for the ink materials described above is the film boiling system.

The ink jet recording apparatus may be used as an output terminal of an information processing apparatus such as computer or the like, a copying apparatus combined with an image reader or the like, or a facsimile machine having information sending and receiving functions.

While the invention has been described with reference to the structures disclosed herein, it is not confined to the details set forth and this application is intended to cover such modifications or changes as may come within the purposes of the improvements or the scope of the following claims.

What is claimed is:

1. A sealed ink jet assembly removable from an ink jet apparatus, comprising:

an ink jet head having
        an ejection outlet, provided at a first surface of said ink jet head, for ejecting an ink;
        an energy generating element for generating energy to eject the ink through said ejection outlet;
        an electric contact portion for supplying an electric signal from the ink jet apparatus to said energy generating element by mounting said electric contact portion to the ink jet apparatus, said electric contact portion being provided on a surface of said ink jet head which is different from said first surface; and
    a removable integral sealing member for sealing said ink ejection outlet and for covering said electric contact portion, wherein said integral sealing member is removed when the assembly is mounted to the ink jet apparatus.

2. A sealed ink jet assembly according to claim 1, further comprising an ink container for containing the ink for supply to said ink jet head.

* * * * *

UNITED STATES PATENT AND TRADEMARK OFFICE
CERTIFICATE OF CORRECTION

PATENT NO. : 5,850,238
DATED : December 15, 1998
INVENTOR(S) : Karita, et al

Page 1 of 10

It is certified that error appears in the above-identified patent and that said Letters Patent is hereby corrected as shown below:

Columns 1 – 18 should be deleted and substituted for the following attached pages.

Signed and Sealed this

Fifteenth Day of May, 2001

Attest:

NICHOLAS P. GODICI

Attesting Officer

Acting Director of the United States Patent and Trademark Office

RECORDING HEAD WITH COVER

This application is a division of application Ser. No. 07/583,334, filed on Sep. 17, 1990, now U.S. Pat. No. 5,262,802.

FIELD OF THE INVENTION AND RELATED ART

The present invention relates to a recording head and a recording head with ink container usable with a printer, a copying machine, an ink jet recording apparatus or the like, and to a storage method thereof, and also to a gap usable for the storage.

The present invention also relates to a package for an ink jet cartridge.

It is known than an ink jet recording head is used in the apparatus having a cap for closing ejection outlets for the clearing (or recovery) operation for improving the ejection property. It is also known to use a large covering member having an air vent for covering the ejection outlets vent after terminating the recording operation.

Ink jet recording head with an integral ink container are sold with sealing tape stuck on the ejection outlet side surface thereof. In some instances, these heads are contained in a package.

However, after the purchased recording head is to be used for the initial recording, the air or gas in the recording head is different depending on the length in which the recording head is stored. In some cases, it is difficult to reach the stabilized operation even if the recovery means is used. To cope with this problem, an attempt has been made to use a stickier tape. However, stronger force is then required to peel the tape with the possible result dropping the recording head or with the result of the ink spilling from the recording head. On the other hand, even if the sealing tape is peeled off without delay, the adhesive material remains in the ejection outlets or around the outlets, thus impeding proper recording.

If the ejection side surface of the recording head is in a stepped form, even the sealing tape is not used conventionally. This is because of the above-described problems and also because of the difficulty in attaching the tape.

SUMMARY OF THE INVENTION

Accordingly, it is a principal object of the present invention to provide a recording head and a method of storage thereof, which do not bring about the complicated recovering means structure, but permit good initial recording after long periods of non-use.

The present invention deals with an unexpected problem. Regarding recording heads, there have been made various proposals directed to the problems during the recording operation. However, there is no indication of the above-described problems. The inventors have carried out various experiments and made various investigations regarding the situation in which the recording heads are placed on the market, and have found the following problems.

In some case, the ink is spilled, and the ink appears in the package although the causes are not known. When the ejection outlets are closed, the ink does not leak during usual long term tests or vibration tests. Unexpectedly, however, when the recording head is slowly and continuously rotated or swung, the ink has been found to leak through the air vent. The likelihood of leakage is greater in the initial state before the head is placed on sale in the store. However, once the recording operation using the head is started the leakage does not occur.

It is another object of the present invention to provide a storage method and a cap for a recording head having a stepped surfaces.

It is a further object of the present invention to provide a recording head, a storage method therefor and a cap therefor, in which the initial recording operation is stabilized after various storage period.

According to an aspect of the present invention, there is provided a recording head comprising an ejection outlet, and a covering member for covering said ink ejection outlet.

According to another aspect of the present invention, there is provided a recording head comprising an ink container provided with an air vent opening, an ink ejection outlet, a sealing member for sealing the ejection outlets and the air vent and an urging member for urging the sealing member against the ejection outlet.

According to a further aspect of the present invention, there is provided a recording head cap comprising an engaging portion engageable with a recording head, a flexible sheet for sealing an ejection outlet and an air vent opening of the recording head, and an elastic member on the flexible sheet to be contacted to the ejection outlet.

According to a further aspect of the present invention, there is provided an ink jet cartridge container, comprising a main body having a recess for accommodating an ink jet cartridge, a cover for covering an opening of the recess, the main body including a wall out of contact with the ink jet cartridge and an inward projection from the wall supporting the ink jet cartridge.

According to a further aspect of the present invention, there is provided a method of starting use of an ink jet cartridge having a recording head with an ink ejection outlet and a ink container integral therewith and having an air vent opening, the ejection outlet and the air vent opening being sealed, wherein the air vent opening is first unsealed, and then the ejection outlet is unsealed.

These and other objects, features and advantages of the present invention will become more apparent upon consideration of the following description of the preferred embodiments of the present invention taken in conjunction with the accompanying drawings.

BRIEF DESCRIPTION OF THE DRAWINGS

FIG. 1 is a developed perspective view of a package for containing the ink jet recording cartridge.

FIG. 2 is an exploded perspective view of an ink jet cartridge.

FIG. 3 is a perspective view of the ink jet cartridge.

FIG. 4 is a perspective view of the ink container of the ink jet cartridge as seen from the side where the ink jet recording head is mounted on a recording apparatus.

FIG. 5 is a top plan view illustrating the ink jet cartridge being mounted on the main assembly.

FIG. 6 is a perspective view of the ink jet recording apparatus.

Figure 7A:
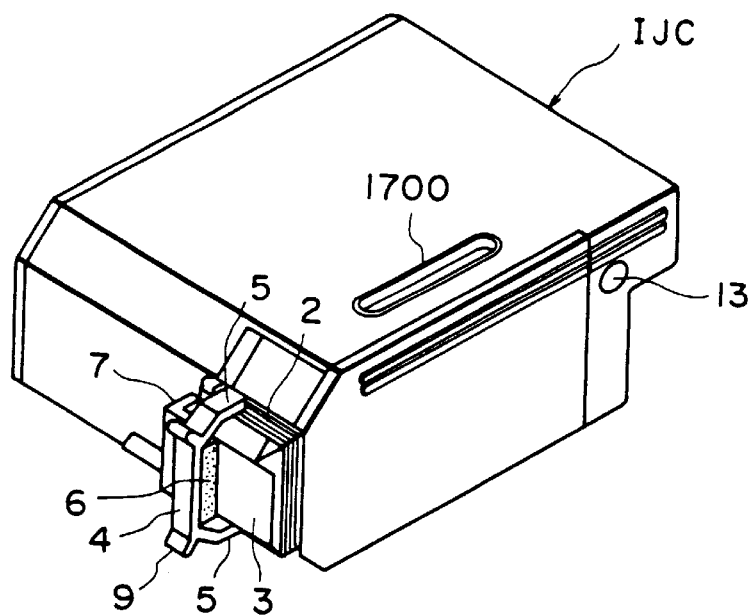
FIGS. 7A and 7B are a perspective view and a partial exploded view of a seal and a cap according to an embodiment of the present invention.
Figure 7B:
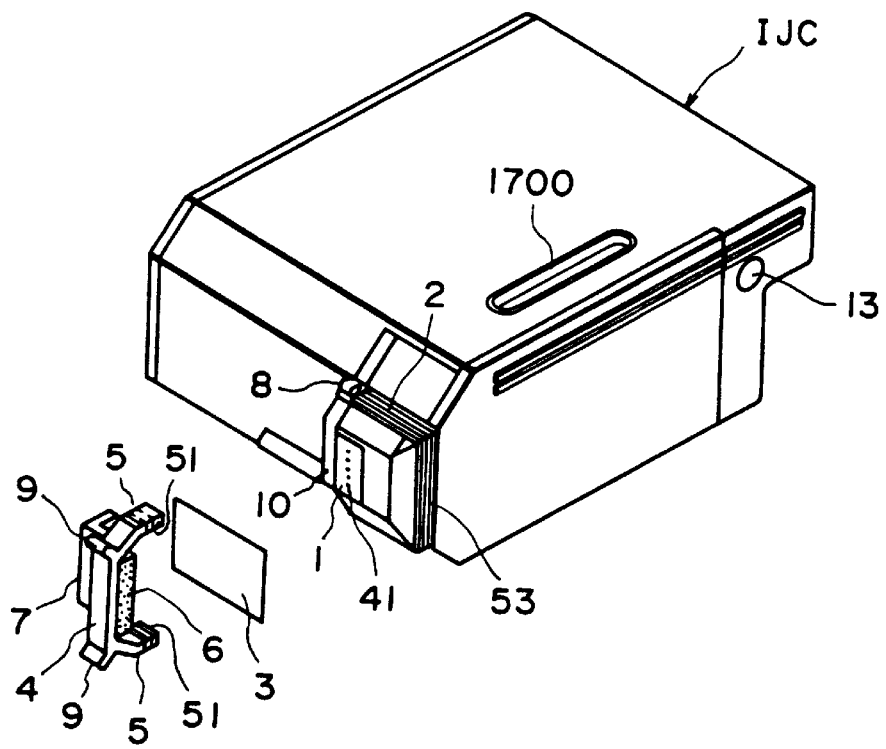

FIGS. 7A and 7B are a perspective view and a partial exploded view of a seal and a cap according to an embodiment of the present invention.

FIG. 8 is a partial exploded view illustrating another embodiment of the present invention.

FIG. 9 is a sectional view of the recording head of FIG. 8.

FIG. 10 is a perspective view of a modified recording head.

FIGS. 11 and 12 are perspective view of a cap and a recording head according to a further embodiment of the present invention.

FIGS. 13A and 13B are a perspective view and a partial exploded view illustrating sealing and air vent.

Figure 14A:
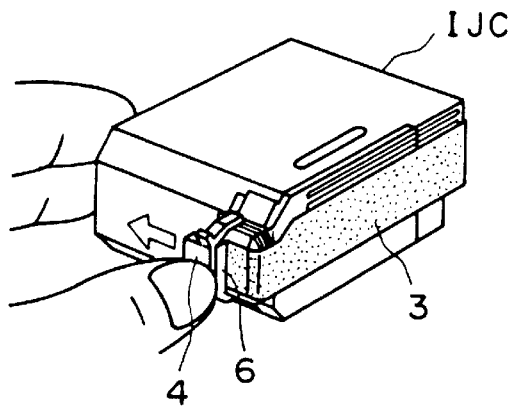
FIGS. 14A, 14B and 14C illustrate how to use the recording head having the structure according to the present invention.
Figure 14B:
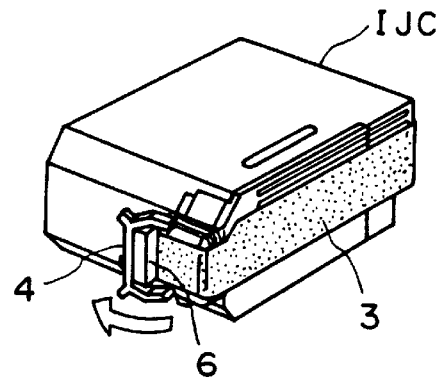
Figure 14C:
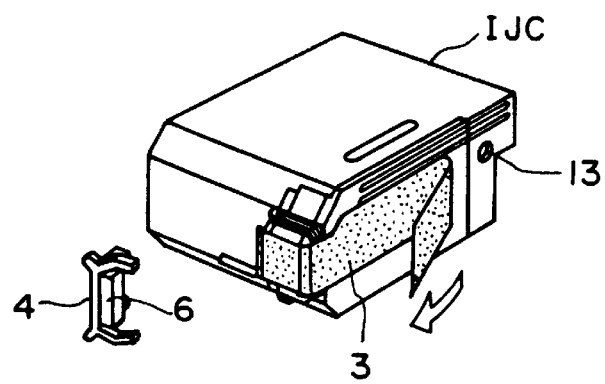

FIGS. 14A, 14B and 14C illustrate how to use the recording head having the structure according to the present invention.

FIGS 15A, 15B and 15C are a top plan view, a front view and light side view of an example of a package according to an embodiment of the present invention.

FIG. 15D is a partial enlarged view illustrating the state around the ejection outlets of the ink jet cartridge.

FIG. 16 is a developed perspective view illustrating the state of use of the package.

FIG. 17 is a side view illustrating the joint between the container and the bottom plate in FIG. 16.

FIG. 18 is a perspective view illustrating the mounting of the ink jet cartridge of FIG. 2 on the carriage of FIG. 5.

DESCRIPTION OF THE PREFERRED EMBODIMENTS

FIGS. 2, 3, 4, 5 and 6 illustrate an ink jet unit IJU, an ink jet heat IJH, an ink container IT, an ink jet cartridge IJC, a head carriage HC and a main assembly IJRA of an ink jet recording apparatus, according to an embodiment of the present invention, and relations among them. The structures of the respective elements will be described in the following.

As will be understood from the perspective view of FIG. 3, the ink jet cartridge IJC in this embodiment has a relatively large ink accommodation space, and an end portion of the ink jet unit IJU is slightly projected from the front side surface of the ink container IT. The ink jet cartridge IJC is mountable at correct position on the carriage HC (FIG. 5) of the ink jet recording apparatus main assembly IJRA by proper positioning means and with electric contacts, which will be described in detail hereinafter. It is, in this embodiment, a disposable type head detachably mountable on the carriage AC. The structures disclosed in FIGS. 2–6 contain various novel features, which will first be described generally.

(i) Ink Jet Unit IJU

The ink jet unit IJU is of the bubble jet recording type using electrothermal transducers which generate thermal energy, in response to electric signals, to produce film boiling of the ink.

Referring to FIG. 2, the unit comprises a heater board 100 having electrothermal transducers (ejection heaters) arranged in a line on a silicon substrate and electric lead lines made of aluminum or the like to supply electric power thereto. The electrothermal transducer and the electric leads are formed by a film forming process. A wiring board 200 is associated with the heater board 100 and includes wiring corresponding to the wiring of the heater board 100 (connected by the wire bonding technique, for example) and pads 201 are disposed at an end of the wiring to receive electric signals from the main assembly of the recording apparatus.

A top plate 1300 is provided with grooves which define partition walls for separating adjacent ink passages and a common liquid chamber for accommodating the ink to be supplied to the respective ink passages. The top plate 1300 is formed integrally with an ink jet opening 1500 for receiving the ink supplied from the ink container IT and directing the ink to the common chamber, and also has an orifice plate 400 having the plurality of ejection outlets corresponding to the ink passages. The material of the integral mold is preferably polysulfone, but may be another molding resin material.

A supporting member 300 is made of metal, for example, and functions to support a backside of the wiring board 200 in a plane, and constitutes a bottom plate of the ink jet unit IJU. A confining spring 500 is in the form of "M" having a central portion urging to the common chamber with a light pressure, and a clamp 501 urges concentratedly with a line pressure to a part of the liquid passage, preferably the part in the neighborhood of the ejection outlets. The confining spring 500 has legs for clamping the heater board 100 and the top plate 1300 by penetrating through the openings 3121 of the supporting plate 300 and engaging the back surface of the supporting plate 300. Thus, the heater board 100 and the top plate 1300 are clamped by the concentrated urging force by the legs and the clamps 501 of the spring 500. The supporting plate 300 has positioning openings 312, 1900 and 2000 engageable with two positioning projections 1012 and positioning and fuse-fixing projections 1800 and 1801 of the ink container IT. It further includes projections 2500 and 2600 at its backside for the positioning relative to the carriage HC of the main assembly IJRA.

In addition, the supporting member 300 has a hole 320 through which an ink supply pipe 2200, which will be described hereinafter, is penetrated for supplying ink from the ink container. The wiring board 200 is mounted on the supporting member 300 by a bonding agent or the like. The supporting member 300 is provided with recesses 2400 and 2400 adjacent the positioning projections 2500 and 2600.

As shown in FIG. 3, and assembled ink jet cartridge IJC has a head projected portion having three sides provided with plural parallel grooves 3000 and 3001. The recesses 2400 and 2400 are located at extensions of the parallel grooves at the top and bottom sides to prevent the ink or foreign matter moving along the groove from reaching the projections 2500 and 2600. The covering member 800 having the parallel grooves 3000, as shown in FIG. 5, constitutes an outer casing of the ink jet cartridge IJC and cooperates with the ink container to define a space for accommodating the ink jet unit IJU. The ink supply member 600 having the parallel groove 3001 has an ink conduit pipe 1600 communicating with the above-described ink supply pipe 2200 and is cantilevered at the supply pipe 2200 side. In order to assure there is capillary action at the fixed side of the ink conduit pipe 1600 and the ink supply pipe 2200, a sealing pin 602 is inserted.

A gasket 601 seals the connecting portion between the ink container IT and the supply pipe 2200. A filter 700 is disposed at the container side end of the supply pipe. The ink supply member 600 is molded, and therefore, can be produced at low cost with high positional accuracy. In addition, the cantilevered structure of the conduit 1600 assures the press-contact between the conduit 1600 and the ink inlet 1500 even if the ink supply member 600 is mass-produced.

In this embodiment, the complete communicating state can be assuredly obtained simply by applying sealing bonding agent from the ink supply member side under the press-contact state. The ink supply member 600 may be fixed to the supporting member 300 by inserting and penetrating backside pins (not shown) of the ink supply member 600 through the openings 1901 and 1902 of the supporting member 300 and by heat-fusing the portion where the pins are projected through the backside of the supporting member 300. The slight projected portions thus heat-fused are accommodated in recesses (not shown) in the ink jet unit (IJU) mounting side surface of the ink container IT, and therefore, the unit IJU can be correctly positioned.

(ii) Ink Container IT

The ink container comprises a main body 1000, an ink absorbing material and a cover member 1100. The ink absorbing material 900 is inserted into the main body 1000 from the side opposite from the unit (IJU) mounting side, and thereafter, the cover member 1100 seals the main body.

The ink absorbing material 900 is thus disposed in the main body 1000. The ink supply port 1200 functions to supply the ink the ink jet unit IJU comprising the above-described parts 100–600, and also functions as an ink injection inlet to permit initial ink supply to the absorbing material 900 before the unit IJU is mounted to the portion 1010 of the main body.

In this embodiment, the ink may be supplied through both an air vent port and this supply opening. In order to assure a good supply of ink, ribs 2300 are formed on the inside surface of the main body 1000, and ribs 2301 and 2302 are formed on the inside of the cover member 1100, which are effective to provide within the ink container an ink existing region extending continuously from the air vent port side to the corner portion of the main body which is furthest from the ink supply opening 1200. Therefore, in order to uniformly distribute the ink in good order, it is preferable that the ink be supplied through the supply opening 1200. This ink supply method is particularly effective. The number of the ribs 2300 in this embodiment is four, and the ribs 2300 extend parallel to direction of movement of the carriage adjacent the rear side of the main body of the ink container, by which the absorbing material 900 is prevented from closely contacting the inner surface of the rear side of the main body. The ribs 2301 and 2302 are formed on the inside surface of the cover member 1100 at a position which is substantially an extension of the ribs 2300, however, as contrasted to the large rib 2300, the size of the ribs 2301 and 2302 are small as if it is divided ribs, so that the existing air space is larger with the ribs 2301 and 2302 than with the rib 2300. The ribs 2302 and 2301 are distributed on the entire area of the cover member 1100, and the area thereof is not more than one half of the total area. Because of the presence of the ribs, even the ink in the corner region of the ink absorbing material which is most remote from the supply opening 1200 can be stably and assuredly supplied to the inlet opening by capillary action. The cartridge is provided with an air vent port for communication between the inside of the cartridge with the outside air. Inside the vent port 1400, there is a water repellent material 1400 to prevent the contained ink from leaking outside through the vent port 1400.

The ink accommodating space in the ink container IT is in the approximate shape of a parallelopiped, the long side of which faces in the direction of carriage movement, and therefore, the above-described rib arrangements are particularly effective. When the long side extends along the direction of movement of the carriage, or when the ink containing space is in the shape of a cube, the ribs are preferably formed over the entire interior of the cover member 1100 to stabilize the ink supply from the ink absorbing material 900. The cubic configuration is preferable from the standpoint of containing as much ink as possible in a limited space. However, from the standpoint of using the ink while minimizing the unavailable amount in the ink container, the ribs formed on the two surfaces constitute a corner.

In this embodiment, the inside ribs 2301 and 2302 of the ink container IT are substantially uniformly distributed in the direction of the thickness of the ink absorbing material having the rectangular configuration. Such a structure is significant, since the air pressure distribution in the ink container IT is kept uniform when the ink in the absorbing material is consumed so that the quantity of the remaining ink unavailable is substantially zero. It is preferable that the ribs be disposed on the surface or surfaces outside a circular arc having its center at the projected position of the ink supply opening 1200 on the top surface of the rectangular ink absorbing material and having a radius which is equal to the long side of the rectangular shape, since then the ambient air pressure is quickly established for the ink absorbing material present outside the circular arc. The position of the air vent of the ink container IT is not limited to the position of this embodiment as long as it is good for introducing the ambient air into the position where the ribs are disposed.

In this embodiment, the backside of the ink jet cartridge IJC is flat, and therefore, the space required when mounted in the apparatus is minimized, while maintaining the maximum ink accommodating capacity. Therefore, the size of the apparatus can be reduced, and simultaneously, the frequency of the cartridge exchange is minimized. Utilizing the rear space of the space used for unifying the ink jet unit IJU is a projection for the air vent port 1401. The inside of the projection is substantially vacant, and the vacant space 1402 functions to supply the air into the ink container IT uniformly in the direction of the thickness of the absorbing material. Because of these features described above, the cartridge as a whole offers better performance than a conventional cartridge. The air supply space 1402 is much larger than that in the conventional cartridge. In addition, the air vent port 1401 is at a raised position, and therefore, if the ink departs from the absorbing material for some reason or another, the air supply space 1402 can tentatively retain the ink to permit such ink to be absorbed back into the absorbing material. Therefore, the wasteful consumption of the ink can be saved.

Referring to FIG. 4, there is shown a structure of a surface of the ink container IT to which the unit IJU is mounted. Two positioning projections 1012 are on a line L1 which is a line passing through the substantial center of the array of the ejection outlets in the orifice plate 400 and parallel to the bottom surface of the ink container IT or parallel to the ink container supporting reference surface of the carriage. The height of projections 1012 is slightly smaller than the thickness of the supporting member 300, and the projections 1012 function to correctly position the supporting member 300. On an extension (right side) in this Figure, there is a pawl (or latch) 2100 with which a right angle engaging surface 4002 of a carriage positioning hook 4001 is engageable. Therefore, the force for the positioning of the ink jet unit relative to the carriage acts in a plane parallel to a reference plane including the line L1. These relationships are significant, since the accuracy of the ink container positioning becomes equivalent to the positioning accuracy of the ejection outlet of the recording head, which will be described hereinafter in conjunction with FIG. 5.

Projections 1800 and 1801 correspond to the fixing holes 1900 and 2000 for fixing the supporting member 300 to the side of the ink container IT, and are longer than the projections 1012, so that they penetrate through the supporting member 300, and the projected portions are fused to fix the supporting member 300 to the side surface. A line L3 passing through the projection 1800 and perpendicular to the line L1, and a line L2 passing through the projection 1801 and perpendicular to the line L1, are drawn. The center of the supply opening 1200 lies substantially on the line L3, and the connection between the supply opening 1200 and a supply pipe 2200 is stabilized, and therefore, even if the cartridge falls, or even if a shock is imparted to the cartridge, the force applied to the connecting portion can be minimized. In addition, since the lines L2 and L3 are not overlapped, and since the projections 1800 and 1801 are disposed adjacent to that projection 1012 which is nearer to the ink ejection outlets of the ink jet head, the positioning of the ink jet unit relative to the ink container is further improved. In this Figure, a curve L4 indicates the position of the outer wall of the ink supply member 600 when it is mounted. Since the projections 1800 and 1801 are located along the curve L4, the projections are effective to provide sufficient mechanical strength and positional accuracy against the weight of the end structure of the head IJH.

An end projection 2700 of the ink container IT is engageable with a hole formed in the front plate 4000 of the carriage to prevent the ink cartridge from being displaced extremely out of the position. A stopper 2101 is engageable with a rod (not shown) of the carriage HC, and when the cartridge IJC is correctly mounted with rotation, which will be described hereinafter, the stopper 2101 take a position below the rod, so that even if an upward force tending to disengage the cartridge from the correct position is accidentally applied, the correctly mounted state is maintained. The ink container IT is covered with a cover 800 after the unit IJU is mounted thereto. Then, the unit IJU is enclosed therearound except for the bottom thereof. However, the bottom opening thereof permits the cartridge IJC to be mounted on the carriage HC, and is close to the carriage HC, and therefore, the ink jet unit is substantially enclosed on all six sides. Therefore, the heat generated by the ink jet head IJH which is in the enclosed space is effective to maintain the temperature of the enclosed space.

However, if the cartridge IJC is continuously operated over a long period of time, the temperature slightly increases. To prevent this temperature increase, the top surface of the cartridge IJC is provided with a slit 1700 having a width smaller than the enclosed space, which increases the spontaneous heat radiation to prevent this temperature rise, while the uniform temperature distribution of the entire unit IJU is not influenced by the ambient conditions.

After the ink jet cartridge IJC is assembled, the ink is supplied from the inside of the cartridge to the chamber in the ink supply member 600 through a supply opening 1200, the hole 320 of the supporting member 300 and an inlet formed in the backside of the ink supply member 600. From the chamber of the ink supply member 600, the ink is supplied to the common chamber through the outlet, supply pipe and an ink inlet 1500 formed in the top plate 1300. The connecting portion for the ink communication is sealed by silicone rubber or butyl rubber or the like to assure a hermetical seal.

In this embodiment, the top plate 1300 is made of resin material having resistivity to the ink, such as polysulfone, polyether sulfone, polyphenylene oxide, polypropylene. It is integrally molded in a mold together with an orifice plate portion 400.

As described in the foregoing, the integral part comprises the ink supply member 600, the top plate 1300, the orifice plate 400 and parts integral therewith, and the ink container body 1000. Therefore, the accuracy in the assembling is improved, and is convenient for mass-production. The number of parts is smaller than in conventional devices, so that the good performance can be assured.

In this embodiment, as shown in FIGS. 2–4, the configuration after assembly is such that the top portion 603 of the ink supply member 600 cooperates with an end of the top thereof having slits 1700, so as to form a slit S, as shown in FIG. 3. The bottom portion 604 cooperates with fed side end 4011 of a thin plate to which the bottom cover 800 of the ink container IT is bonded, so as to form a slit (not shown) similar to the slit S. The slits between the ink container IT and the ink supply member 600 are effective to increase heat radiation, and is also effective to prevent any pressure accidentally applied to the ink container IT from influencing directly the supply member or to the ink jet unit IJT.

The above-described various structures are individually effective to provide their respective advantages, and also they are most effective when they are combined each other.

(iii) Mounting of the Ink Yet Cartridge IJC to the Carriage HC

In FIG. 5, a platen roller 5000 guides the recording medium P from the bottom to the top. The carriage HC is movable along the platen roller 5000. The carriage HC comprises a front plate 4000, a supporting plate 4003 for electric connections and a positioning hook 4001. The front plate 400 has a thickness of 2 mm, and is disposed closer to the platen. The front plate 4000 is disposed close to the front side of the ink jet cartridge IJC, when the cartridge IJC is mounted to the carriage. The supporting plate 4003 supports a flexible sheet 4005 having pads 2011 corresponding to the pads 201 of the wiring board 200 of the ink jet cartridge IJC and a rubber pad sheet 4007 for applying an elastic force to urge the backside of the flexible sheet 4005 against the pads 201. The positioning hook 4001 functions to fix the ink jet cartridge IJC to the recording position. The front plate 4000 is provided with two positioning projection surfaces 4010 corresponding to the positioning projections 2500 and 2600 of the supporting member 300 of the cartridge described hereinbefore. After the cartridge is mounted, the front plate receives the force in the direction perpendicular to the projection surfaces 4010. Therefore, plural reinforcing ribs (not shown) extend in the direction of the force at the platen roller side of the front plate. The ribs project slightly toward the platen roller (approximately 0.1 mm) from the front side surface position L5 when the cartridge IJC is mounted, and therefore, they function as head protecting projections. The supporting plate 4003 is provided with plural reinforcing ribs 4004 extending in a direction perpendicular to the above-described front plate ribs. The reinforcing ribs 4004 have heights which decrease from the plate roller side to the hook 4001 side. By this, the cartridge is inclined as shown in FIG. 5, when it is mounted.

The supporting plate 4003 is provided with two additional positioning surfaces 4006 at the lower left portion, that is, at the position closer to the hook. The positioning surfaces 4006 correspond to projection surfaces 4010 by the additional positioning surfaces 4006, and the cartridge receives the force in the direction opposite from the force received by the cartridge by the above-described positioning projection surfaces 4010, so that the electric contacts are stabilized. Between the upper and lower projection surfaces 4010, there is disposed a pad contact zone, so that the amount of deformation of the projections of the rubber sheet 4007 corresponding to the pad 2011 is determined. When the cartridge IJC is fixed at the recording position, the positioning surfaces are brought into contact with the surface of the supporting member 300. In this embodiment, the pads 201 of the supporting member 300 are distributed so that they are symmetrical with respect to the above-described line L1, and therefore, the amount of deformation of the respective projections of the rubber sheet 4007 is made uniform to stabilize the contact pressure of the pads 2011 and 201. In this embodiment, the pads 201 are arranged in two columns and two rows.

The hook 4001 is provided with an elongated hole engageable with a fixed pin 4009. Using the degree of movement afforded by the elongated hole, the hook 4001 rotates in the counterclockwise direction, and thereafter, it moves leftwardly along the platen roller 5000, by which the ink jet cartridge IJC is positioned on the carriage HC. Such a movable mechanism of the hook 4001 may be accomplished by another structure, but it is preferable to use a lever or the like. During the rotation of the hook 4001, the cartridge IJC moves from the position shown in FIG. 5 to the position toward the platen side, and the positioning projections 2500 and 2600 come to the position where they are engageable to the positioning surfaces 4010. Then, the hook 4001 is moved leftwardly, so that the hook surface 4002 contacts the pawl (or latch) 2100 of the cartridge IJC, and the ink cartridge IJC rotates about the contact between the positioning surface 2500 and the positioning projection 4010 in a horizontal plane, so that the pads 201 and 2011 are placed in contact with each other. When the hook 4001 is locked, that is retained at the fixing or locking position, by which the complete contacts are simultaneously established between the pads 201 and 2011, between the positioning portions 2500 and 4010, between the standing surface 4002 and the standing surface of the pawl and between the supporting member 300 and the positioning surface 4006, and therefore, the cartridge IJC is completely mounted on the carriage.

(iv) General Arrangement of the Apparatus

FIG. 6 is a perspective view of an ink jet recording apparatus IJRA in which the present invention is used. A lead screw 5005 is driven by drive transmission gears 5011 and 5009 in turn driven by the forward and backward rotation of a driving motor 5013. The lead screw 5005 has a helical groove 5004 with which a pin (not shown) of the carriage HC is engaged, by which the carriage HC is reciprocable in directions a and b. A sheet confining plate 5002 confines the sheet on the platen over the carriage movement range. Home position detecting means 5007 and 5008 are in the form of a photocoupler to detect presence of a lever 5006 of the carriage, in response to which the rotational direction of the motor 5013 is switched. A supporting member 5016 supports the front side surface of the recording head with a capping member 5022 for capping the recording head. Sucking means 5015 functions to suck the recording head clear through the opening 5023 of the cap so as to recover the recording head.

A cleaning blade 5017 is moved toward front and rear by a moving member 5019. These elements are supported on the supporting frame 5018 of the main assembly of the apparatus. The blade may be in another form, more particularly, a known cleaning blade. A lever 5021 is effective to start the sucking recovery operation and is moved with the movement of a cam 5020 engaging the carriage, and the driving force from the driving motor is controlled by known transmitting force means such as a clutch or the like.

The capping, cleaning and sucking operations can be performed when the carriage is at the home position by the lead screw 5005, in this embodiment. However, the present invention is usable in another type of system wherein such operations are effected at different timing. The individual structures are advantageous, and in addition, the combination thereof is further preferable.

Referring to FIGS. 1 and 7, the package of the ink jet recording cartridge will be described, wherein there are provided a sealing member for closing the ejection outlets, the electric contacts and the air vent (or ink ejection outlet covering member) and an urging member for applying pressure to the sealing member, by which manner the ejection outlets and the air vent are closed before use (non-recording).

The description will first be made in conjunction with FIG. 1, FIGS. 13A and 13B. FIG. 13A illustrates the ink jet cartridge IJC having the structure described above. FIG. 13B shows the state wherein a sealing member 3 and a cap 4 (urging member) are removed from the cartridge IJC. FIG. 1 shows an example of a package for the ink jet cartridge IJC.

FIG. 16 shows the packaged state.

FIGS. 8 and 9 show the recording head.

In FIG. 13A, the ink jet cartridge IJC has an integral recording head and ink container. The ink container contains an ink absorbing material therein, and supplies ink to the recording head. The recording head is provided with thermal energy generating elements 91 as shown in FIG. 8, a base plate 100 on which electric contact 92 are formed and an orifice plate 400 having plural ejection outlets. In this embodiment, the top plate 1300 having grooves for defining a part of the liquid passages is integral with the orifice plate 400 by the molding. Reference numeral S designates an opening through which the electric contact can be observed, and is disposed in the top surface of the recording head. Reference numeral 10 designates an aluminum plate having an integral positioning portion 8 engageable with a positioning portion 4010 of the carriage of the main assembly of the recording apparatus for the positioning of the entire recording head. Reference numeral 1 designated an ejection side surface including the orifice plate 400. Reference numeral 41 designates the ink ejection surface. In this Figure, an opening for absorbing backward waves during the recording or another opening such as a dummy nozzle, are not shown. Such an opening or openings may be formed in the ejection side surface 1. Reference numeral 2 designates grooves formed on the top and bottom sides behind the ejection side surface, and in this embodiment, four of such grooves are formed. Reference numeral 53 designates side grooves formed at a side faced to the base plate 10, and four of such grooves are provided connecting the grooves 2. When the scattered ink is accumulated in the groove 2, the side grooves can guide it to the bottom. The grooves 2 of the recording head are effective to maintain engagement with a cap 4 by elastic force at the grooves 51.

Reference numeral 3 designates a sealing sheet and is sized to entirely cover the ejection side surface of the recording head and extend to the air vent to completely cover it.

The sealing sheet 3 is bonded by a bonding agent or a bonding agent layer (on the sheet) at the side surface of the cartridge IJC and the portion around the air vent opening 13.

As shown in FIG. 13A, the cap 4 has a width corresponding to the ejection side surface 1 and is provided with opposite arms 5, an elastic member away from the arms and fixed to the inside thereof, an elastic deformation limiting portion 7 provide at a side thereof toward the base plate 10 for the purposes of positioning, and projections 9 to be used when the cap 4 is mounted to or demounted from the recording head. These portions are integral together. The arms 5 have three grooves 51 on their inside surface, which is engageable with the above-described grooves 2. As will be understood from FIGS. 13B and 14C, in this embodiment, seal 3 is extended to the base plate 10, and simultaneously, an elastic member 6 is faced to the base plate. By doing so, the sealing effect to the ejection outlets 41 is enhanced, since it is close to the base plate 10. The limiting portion 7 has such a length that when the cap 4 is mounted on the recording head, the backside of the base plate 10 is lightly contacted thereto. The length of contact is approximately 1 mm. By the simple structure described above, the elastic member 6 of the cap 4 is correctly positioned to be urged against the base plate by the functions of the arms 5 and the limiting portion 7. Thus, the sealing effect for the opening can be provided with the simple structure and without the problem arising from the use of the bonding agent.

A description will be given as to the engagement between the grooves 2 and 51. Upon the mounting, the projections 9 are nipped toward each other and the arms 5 expand therebetween by the elastic deformation. With the expansion, the recording head is disposed between the arms of the cap, and then, the projections 9 are released, by which the grooves 2 and the grooves 51 are engaged with each other. Even if the position is deviated by one groove at this time, the adjustment is easy by the balance between the elastic force of the arms and the elastic force resulting from the deformation of the elastic member 6. Then, when the same number of grooves are engaged, the entire balance is proper, and therefore, the sealing effect is good with the proper pressure distribution for the sealing. Thus, good sealing can be achieved. The material and thickness of the elastic member 6 is such that the sheet 3 is urged to provide sufficient sealing effect when the grooves 2 and 51 are engaged.

In this embodiment, the sheet 3 is made of polyethylene terephthalate or tetrafluoroethylene resin having a thickness of 12-30 microns and having flexibility. The elastic member 6 is made of sponge having a thickness of 3 mm, and it may be silicone sponge or polyurethane sponge. The above materials are not limiting.

FIGS. 8 and 9 show additional embodiments wherein the ejection side surface has stepped surface portions having height of approximately 30 microns and a continuing surface portion having a height of approximately 70 microns. The present invention is conveniently applicable to such a stepped surface with assured sealing effect.

Referring to FIG. 9, there is shown a further embodiment wherein a common chamber has a zone Z connecting from the liquid passage and expanding toward an ink receptor (rightward) and a slanted surface 21 extending from the ink receptor to the region. An extension of the slanted surface 21 abuts the surface of the base plate 100 at a point Po, which is the surface on which the ejection energy generating means H is disposed. In this embodiment, the slanted surface in H inclined relative to the center line C2 of the ink passage or the extension of the liquid passage by approximately 22 degrees, and the lateral walls are inclined by an angle of 15 degrees (B).

By the provision of the expanding zone Z, fine bubbles can be concentrated here, and the concentrated bubbles are retained at a position away from the extension of the liquid passage having the ejection energy generating means H. By the remote position alone, the bubbles can be guided away from the liquid passage. Therefore, even if the bubbles coalesce into a large bubble, the ink supply is not obstructed for a relatively long period of time. Therefore, interference with normal recording can be significantly delayed. In addition, the extension of the slanted surface crosses the base plate 100, and therefore, even if the bubble moves along the slanted surface toward the liquid passage, the base plate impedes the movement, and therefore, the large bubble does not enter the liquid passage. The angles are exemplary and not limiting.

The structure which will be described in the following is particularly effective when the recovery operation is effected by sucking recovery of the ink, but is also usable when the recovery is effected by pressurizing. Reference numeral 41 designates a symmetric trapezoidal configuration of the opening of the liquid passage at the orifice plate side. Reference numeral 111 designates the symmetric trapezoidal configuration of the inside part of the ejection outlet in the orifice plate. In this embodiment, the cross-section of the liquid passage and the ejection outlet continuing thereto are all symmetrically trapezoidal. The long side of the trapezoid corresponds to the provision of the ejection energy generating means, By doing so, the dispersion of the bubbles in the liquid can be made non-uniform, by which the bubbles are concentrated toward the short side of the trapezoid, and in addition, the course of the bubble ejection upon recovery operation can be concentrated, so that the bubble discharging effects can be enhanced. The short side of the liquid passage trapezoid corresponds to the short side of the ejection outlet, and the long side corresponds to the long side, and by doing so production of turbulent flow of the ink upon recovery operation can be minimized, so that the bubble discharging effect can be stabilized. The symmetric trapezoidal configuration is particularly preferable.

In this embodiment, there is a first region which is expanding adjacent the ejection outlet with the symmetrical trapezoidal configuration maintained (the region from line P1 and the openings 141 and 111) and a second region converging with the symmetric trapezoidal configuration maintained and continuing to the symmetric trapezoidal ejection outlet. By doing so, the turbulent flow of the ink is avoided, and therefore, the bubbles can be assured of removal. Further, in this embodiment, in FIG. 9, the first and second regions have symmetricity about a plane (line C1) formed by connecting the sides of the symmetric trapezoid, and therefore, the pressure distribution upon the recovery operation can be made uniform, and therefore, eddy flow during the recovery operation can be suppressed. In addition, an extension of the line C1 crosses at a point P3 with the surface on which the heat generating element is provided, and therefore, the ejection energy is efficiently used for the ejection of the ink.

The present invention is usable with an ink jet recording head, wherein the top plate and the base plate are clamped by the clamping member applying a line pressure to one of them, thus clamping them.

In a further embodiment, the orifice plate has three surfaces OP1, OP2, and OP3 divided by the lines H and I. The direction of the liquid droplet ejection is stabilized on an extension of the line C1, and therefore, the recording surface is perpendicular to the line C1. In this example, the recording sheet moves upwardly. Since the orifice plate has a stepped surface with small inclination, and therefore, the ejection side surface can be cleaned in good order by wiping the surface. In addition, the retraction of the meniscus of the ink at the ejection outlet which can occur at the timing of the capping operation, can be prevented. Therefore, various problems arising from the improper ink ejection and other problems therefrom can be solved by this simple structure.

In FIG. 9, the height of the zone Z is preferably the same as or smaller than the height of the liquid passage, and the angle θ2 of the zone Z is 10 degrees. It is preferably not more than one half of the angle θ1 of the slanted surface 21.

As will be understood from FIG. 9, the ejection side surface and the peripheral surface thereof are assuredly sealed by the sheet 3, and the sealing is assured by the elastic deformation of the elastic member 6, and the sealing effects are sufficient.

In addition, the air vent opening 13 of the cartridge IJC, is sealed by the same sheet 3, and therefore, any evaporation of the ink component is prevented.

Referring to FIG. 1, a package for the ink jet cartridge will be described. The package includes the main body 61 and a cover 63, and together they constitute a package.

The main body of the package 61 includes walls 61c maintained away from the object (ink jet cartridge IJC), recesses 61a projecting inwardly from the walls 61c toward the ink jet cartridge IJC to support it at a fixed position, and a flange 61b for connection with the cover 63. The ejection outlets of the ink jet cartridge IJC are maintained out of contact with the wall. As shown in this Figure, that one of the four recesses 61a which accommodates the ejection outlets has a larger depth, by which the ejection outlets are more inside in the package, so that the ejection outlets can be more securely protected. In addition, users are prevented from inserting the ink jet cartridge with the incorrect orientation.

The material and the dimensions of the walls 61c are selected so that it has sufficient strength. The thickness thereof is dependent on the material, but it is not less than 0.1 mm, preferably not less than 0.3 mm, further preferably not less than 0.5 mm, and not more than 1.2 mm, for example.

On the other hand, the material defining the recesses 61a is preferably selected so that it has flexibility to absorb the shock for the protection of the contents. If the material defining the recesses 61a is the same as the material of the wall 61c having the same strength and rigidity, the impact received by the walls 61c tends to be directly transmitted to the contents with possible damage thereto. From this standpoint, the material of the recess 61a has a smaller thickness and exhibits elasticity. It is generally not more than 0.8 mm, and preferably not more than 0.6 mm, further preferably not more than 0.4 mm, the lower limit is, for example, 0.05 mm.

For the main body 61, various resin materials are usable. The main body 61 may be integrally molded with resin material. The integral molding is advantageous in the formability and manufacturing cost or the like.

For the integral molding of the main body 61, injection molding and vacuum molding for the resin material is usable. Among these injection molding with ABS resin, polystyrene, polypropylene, polyethylene, polyethylene terephthalate or other resin material, is preferable because of ease in the adjustment of the thickness of the wall 61c and the recess defining material 61a and because of the relatively low cost thereof.

By the provision of the flange 61b, the main body can be easily bonded to the bottom plate 63. The flange 61b may be integrally molded with the main body 61. The thickness of the flange 61b may be equivalent to that of the wall 61c. The flange 61b is preferably provided with a rib 61e along the bonding region 62 with the covering member 63 for the purpose of reinforcement. The rib 61e is projected toward the cover 63, but the direction of the projection may be reversed. However, the former is preferable from the standpoint of assuring the bonding between the main body 61 and the cover 63.

The corners of the main body are preferably rounded as shown in the Figure to ease the shock thereto. The radius of the curvature of the roundings is preferably relatively large, and is determined in accordance with the size of the recess 61a, but is not less than 2 mm, for example, preferably not less than 3 mm, and more preferably not less than 5 mm. The configuration of the recess 61a can be properly determined by one with ordinary skill in the art so that the ink cartridge IJC is protected and is effectively fixed in the package. In the example shown, the ink cartridge IJC is supported by the four recesses 61a, but the number thereof may be changed.

The clearance between the supporting portion of the recesses 61a of the ink jet cartridge and the ink jet cartridge is for example 0.5–3 mm, preferably 0.5–2 mm.

The material and thickness of the cover 63 is properly selected by one of ordinary skill in the art with consideration of the weight of the ink jet cartridge or an intended strength. The cover 63 is made of resin or metal film, sheet or plate or a laminated structure including at least one of the above.

The joining between the main body 61 and the cover 63 after the ink jet cartridge IJC is placed in the main body 61 can be accomplished using various methods. For example, the cover 63 may be made of the same material as the main body 61, and they can be joined by heat-fusing or by ultrasonic fusing. An easy-peel layer may be applied on the joining region of the bottom plate 63, and they can be bonded using it.

When the main body 61 is made of polypropylene material and is produced by vacuum molding, the corners may be rounded as described in the foregoing. By doing so, the humidity maintaining function can be provided, in addition to the advantage described hereinbefore.

A male die method is usable wherein the portion of blank sheet other than the portion constituting into the top part 61c-2 is extended by vacuum toward the bottom surface (flange 61b), to form the recesses 61a, the side surface 61c-1 of the wall 61c and the curved portion. Then, the thickness of the various parts can be made uniform without pin holes so that the content can be protected from moisture absorption.

Referring to FIGS. 15A, 15B, 15C and 15D, there are shown the package as a view from the top (FIG. 15A), as a view from the front side (FIG. 15B) and as a view from the right side (FIG. 15C) and as an enlarged view (FIG. 15D).

In the foregoing embodiment, the air vent opening and the ejection outlets are sealed by the same sealing member, and an urging (elastic) member assures the sealing at the ejection outlets.

In this embodiment, the connection between the sealing member and the ejection outlets is preferably made with a bonding agent, but this is not mandatory.

FIGS. 11 and 12 show a modification. In FIG. 11, the projections 9, the arms 5 and 5 and the elastic member 6 of the cap 4 of the urging member has a size corresponding to the entirety of the head portion. Then, the mounting condition of the cap 4 is improved. In this case, the engaging length between the grooves 51 and 2 is increased, and therefore, the mounting and dismounting of the cap 4 can be effected by sliding it in the direction in which the grooves 2 extend. In FIG. 12, the cap 4 itself has a seal 3 and the elastic material 6 as a unit. The sealing member 3 may be in any form if it seals the air vent opening 13 and the ejection outlets 41. Preferably, the sealing member may be peeled so that the air vent opening is first opened, and then, the ejection outlets are opened, as shown in FIG. 14.

FIG. 7 shows the sealing member of FIG. 14 as provided only to the ejection outlets 41. This is only effective to provide the sealing effect to the ejection outlet 41. The sealing member 3 is preferably long enough to permit easy peeling toward a side of the cartridge beyond the head portion (FIG. 15D).

FIG. 10 shows an embodiment wherein the cap of FIG. 11 seals only the ejection outlets. In this embodiment, the sealing member 3 and the elastic member 6 are made integral and have a size covering the entire head portion. According to this embodiment, the sealing effect relative to the ejection outlets is maintained, and the operativity is improved. With this structure, when the cartridge is not used and removed from the apparatus, the cap may be reused to recover the head for the same purpose.

FIGS. 16 and 17 shows the state of the package when it is sold. The hole 65 in the cover 64 is provided to permit insertion of a pin. The ejection outlet side of the cartridge IJC faces away from the hole 65. Therefore, when the package is in the store, the ejection side is at the bottom, and the air vent opening is in the middle, and the hole 65 is at the top. At this time, the ejection outlets are sealed by the cap or the sealing member, and the air vent hole is sealed, preferably. However, if it is left for a few years, the water evaporates through the air vent. However, in the above-described orientation, the ink is urged to the ejection outlet 41 side by the gravity, and therefore, the bubble or bubbles produced by the evaporation are prevented from being concentrated to the ejection outlet side. Therefore, the package and the packing method is preferable in consideration of a long term storage.

In FIG. 17, the package is equivalent to that shown in FIG. 1. In this embodiment, the thickness of the wall c is not less than 0.1 mm, preferably not less than 0.3 mm, further preferably not less than 0.5 mm, and the upper limit is 1.2 mm.

The recess a has a smaller thickness and exhibits elasticity. The thickness of the material defining the recess a has a thickness not more than 0.8 mm, preferably not more than 0.6 mm, further preferably not more than 0.4 mm.

FIG. 18 shows a further embodiment, wherein the sealing member 3 seals not only the ejection outlets but also protects electric contacts 201. Reference character F designates a flexible cable for the electric wiring and is connected with the electric contacts 2001 of a connector projection 4003 of the head carriage Hc. The opening 1701 of the recording head is large enough to accommodate the projection 4003 (axb). The opening 1700 in the top of the head is smaller than it. Therefore, it is preferable to protect the opening 1701 by the seal.

The ink jet cartridge IJC is mounted to the printer carriage Hc so that the connector projection 4003 is inserted through the opening 1701. At this time, the opening 1701 is provided with the protection tape 3 which is the same as the tape protecting the ejection outlets. Therefore, it is required to be mounted after the tape is peeled off. Therefore, the users are prevented from forgetting to peel the seal. Since the protection of the contacts is accomplished by that for sealing as the sealing member for the ejection outlets, failure to peel the seal can be sensed when there is a failure of the recording operation. Thus, the use of the same seal is effective to warn the operator of various malfunctions.

The present invention is particularly suitable for use in a bubble jet recording head and recording apparatus developed by Canon Kabushiki Kaisha, Japan. This is because high density of the picture elements, and the high resolution of the recording are possible.

The typical structure and the operational principle are preferably the one disclosed in U.S. Pat. Nos. 4,723,129 and 4,740,796. The principle is applicable to a so-called on-demand type recording system and is a continuous type recording system particularly suitable for the on-demand type because the principle is such that at least one driving signal is applied to an electrothermal transducer disposed on a liquid (ink) retaining sheet or liquid passage, the driving signal being enough to provide a quick temperature rise beyond a departure from nucleation boiling point, so that the thermal energy is provided by the electrothermal transducer to cause film boiling on the heating portion of the recording head, whereby a bubble can be formed in the liquid (ink) corresponding to each of the driving signals. By the development and collapse of the bubble, the liquid (ink) is ejected through an ejection outlet to produce at least one droplet. The driving signal is preferably in the form of a pulse, because the development and collapse of the bubble can be effected instantaneously, and therefore, the liquid (ink) is ejected with quick response. The driving signal in the form of the pulse is preferably such as disclosed in U.S. Pat. Nos. 4,463,359 and 4,345,262. In addition, the rate of temperature increase of the heating surface is preferably such as disclosed in U.S. Pat. No. 4,313,124.

The structure of the recording head may be as shown in U.S. Pat. Nos. 4,558,333 and 4,459,600 wherein the heating portion is disposed at a bent portion in addition to the structure of the combination of the ejection outlet, liquid passage and the electrothermal transducer as disclosed in the above-mentioned patents. In addition, the present invention is applicable to the structure disclosed in Japanese Laid-Open Patent Application Publication No. 123670/1984 wherein a common slit is used as the ejection outlet for plural electrothermal transducers, and to the structure disclosed in Japanese Laid-Open Patent Application No. 138461/1984 wherein an opening for absorbing pressure waves of the thermal energy is formed corresponding to the ejecting portion. This is because the present invention is effective to perform the recording operation with certainty and at high efficiency irrespective of the type of the recording head.

The present invention is effectively applicable to a so-called full-line type recording head having a length corresponding to the maximum recording width. Such a recording head may comprise a single recording head or plural recording heads combined to cover the entire width.

In addition, the present invention is applicable to a serial type recording head wherein the recording head is fixed on the main assembly, to a replaceable chip type recording head which is connected electrically with the main apparatus and can be supplied with ink when mounted in the main assembly, or to a cartridge type recording had having an integral ink container.

The provision of the recovery means and the auxiliary means for the preliminary operation are preferable, because they can further stabilize the effect of the present invention. As for such means, there are capping means for the recording head, cleaning means therefor, pressing or sucking means, preliminary heating means by the ejection electrothermal transducer or by a combination of the ejection electrothermal transducer and an additional heating element and means for preliminary ejection not for the recording operation, which can stabilize the recording operation.

As regards the kinds of the recording head mountable, it may be single head corresponding to a single color ink, or there may be plural heads corresponding to the plurality of ink materials having different recording color or density. The present invention is effectively applicable to an apparatus having at least either a monochromatic mode mainly with black, a multi-color with different color ink materials or a full-color mode by the mixture of the colors which may be an integrally formed recording unit or a combination of plural recording heads.

Furthermore, in the foregoing embodiment, the ink has been liquid. It may be, however, an ink material solidified at the room temperature or below and liquefied at the room temperature. Since in the ink jet recording system, the ink is controlled so that the temperature is not less than 30° C. and not more than 70° C. to stabilize the viscosity of the ink to provide the stabilized ejection, in usual recording apparatus of this type, the ink is such that it is liquid within the temperature range when the recording signal is applied. In addition, any temperature rise due to the thermal energy is positively prevented by using the energy to effect the state change of the ink from the solid state to the liquid state, or the ink material is solidified when it is left is used to prevent the evaporation of the ink. In either of the cases, the application of the recording signal produces thermal energy, the ink may be liquefied, and the liquefied ink may be ejected. The ink may start to be solidified at the time when it reaches the recording material. The present invention is applicable to such an ink material as is liquefied by the application of the thermal energy. Such an ink material may be retained as a liquid or solid material stored in through holes or recesses formed in a porous sheet as disclosed in Japanese Laid-Open Patent Application No. 56847/1979 and Japanese Laid-Open Patent Application No. 71260/1985. The sheet faces the electrothermal transducers. The most effective one for the ink materials described above is the film boiling system.

The ink jet recording apparatus may be used as an output terminal of an information processing apparatus such as computer or the like, a copying apparatus combined with an image reader or the like, or a facsimile machine having information sending and receiving functions.

While the invention has been described with reference to the structures disclosed herein, it is not confined to the details set forth and this application is intended to cover such modifications or changes as may come within the purposes of the improvements or the scope of the following claims.

What is claimed is:

1. A sealed ink jet assembly removable from an ink jet apparatus, comprising:

an ink jet head having an ejection outlet, provided at a first surface of said ink jet head, for ejecting an ink;

an energy generating element for generating energy to eject the ink through said ejection outlet;

an electric contact portion for supplying an electric signal from the ink jet apparatus to said energy generating element by mounting said electric contact portion to the ink jet apparatus, said electric contact portion being provided on a surface of said ink jet head which is different from said first surface; and a removable integral sealing member for sealing said ink ejection outlet and for covering said electric contact portion, wherein said integral sealing member is removed when the assembly is mounted to the ink jet apparatus.

2. A sealed ink jet assembly according to claim 1, further comprising an ink container for containing the ink for supply to said ink jet head.

* * * * *